United States Patent
Song et al.

(10) Patent No.: US 8,032,468 B2
(45) Date of Patent: Oct. 4, 2011

(54) IDENTIFYING AND RECOMMENDING POTENTIAL USES OF COMPUTING SYSTEMS BASED ON THEIR PATTERNS OF USE

(75) Inventors: Yu Song, Pleasanton, CA (US); Doreen Cheng, San Jose, CA (US); Swaroop Kalasapur, Sunnyvale, CA (US); Dongyun Jin, Urbana, IL (US)

(73) Assignee: Samsung Electronics Co., Ltd., Suwon (KR)

( * ) Notice: Subject to any disclaimer, the term of this patent is extended or adjusted under 35 U.S.C. 154(b) by 802 days.

(21) Appl. No.: 12/106,163

(22) Filed: Apr. 18, 2008

(65) Prior Publication Data

US 2009/0055334 A1 Feb. 26, 2009

Related U.S. Application Data

(63) Continuation-in-part of application No. 12/041,389, filed on Mar. 3, 2008.

(60) Provisional application No. 60/965,963, filed on Aug. 22, 2007, provisional application No. 60/981,812, filed on Oct. 22, 2007.

(51) Int. Cl.
*G06E 1/00* (2006.01)
*G06E 3/00* (2006.01)
*G06F 15/18* (2006.01)
*G06G 7/00* (2006.01)
(52) U.S. Cl. ....................................... 706/17
(58) Field of Classification Search .............. 706/17
See application file for complete search history.

(56) References Cited

U.S. PATENT DOCUMENTS

| 7,606,772 B2 | 10/2009 | Flinn et al. |
| 2002/0174025 A1* | 11/2002 | Hind et al. ............... 705/26 |
| 2004/0068627 A1 | 4/2004 | Sechrest et al. |
| 2006/0271618 A1* | 11/2006 | Kokubo et al. ............ 709/202 |
| 2008/0022001 A1 | 1/2008 | Godavarti et al. |
| 2008/0250316 A1 | 10/2008 | Zhang et al. |
| 2009/0049514 A1 | 2/2009 | Yan et al. |

OTHER PUBLICATIONS

'A survey of context aware mobile computing research': Chen, 2000, Dartmouth Computer Science Technical Report TR2000-381.*
Ghahramani et al., "Probabilistic models for Unsupervised Learning," NIPS Tutorial, Gatsby Computational Neuroscience Unit, University College London, Dec. 1999.
Kleek et al., "Getting to Know You Gradually: Personal Lifetime User Modeling (PLUM)", a poster at CHI 2007, 4 pages.

(Continued)

*Primary Examiner* — Omar Fernandez Rivas
*Assistant Examiner* — Peter Coughlan
(74) *Attorney, Agent, or Firm* — Beyer Law Group LLP

(57) ABSTRACT

Techniques for identifying potential uses of computing systems are disclosed. A potential use of a computing system can be identified by considering the context that effectively represents a situation for the computing system and further considering a known situation to be a match for the situation. As such, a potential state of use of the computing system can be identified based on one or more known states of use of the computing system. A matching situation can, for example, be determined, based on pattern of use data that effectively associates a state of use with a situation in which the use may or has occurred. Identifying a potential state of use, among other things, allows making various applications, tasks, and/or services more accessible and/or effectively recommending what is likely to be used for a given situation without requiring supervised training or direct feedback from a user.

32 Claims, 14 Drawing Sheets

OTHER PUBLICATIONS

Yu et al., "Context-Aware Media Personalization", ICOST 2006, pp. 359-362, IOS Press, United Kingdom.

Dornbush et al., "Xpod—A human activity and emotion aware mobile music player," University of Maryland Baltimore County, United States, Nov. 2005.

Raento et al., "ContextPhone: A prototyping Platform for Context-Aware Mobile applications," IEEE Pervasive computing, 2005, 9 pages.

Yu et al., "Supporting Context-Aware Media Recommendations for Smart Phones," Pervasive computing, IEEE, vol. 5, Issue 3, Jul.-Sep. 2006, p. 68-75.

Berstein et al., "Management of Personal Information Scraps," CHI 2007, 6 pages.

Dustdar et al., "A Survey on context-aware systems," Int. J. Ad Hoc and Ubiquitous Computing, vol. 2, No. 4, 2007, 15 pages.

Fried, "Nokia to include Windows Live services," CNET News.com, Aug. 22, 2007, http://news.cnet.com/nokia-to-include-windows-live-services/2100-1039-6204013.html?part=dht&tag, 1 page.

Schmidt, et al., "Context-Phonebook—Extending Mobile Phone Applications with Context", MobileHCI workshop, 2001, 6 pages.

U.S. Appl. No. 12/041,389, filed Mar. 3, 2008.

U.S. Appl. No. 12/106,237, filed Apr. 18, 2008.

Chen et al., "A Survey of Context-Aware Mobile Computing Research," Dartmouth Computer Science Technical Report TR2000-381, Dartmouth College, 2000.

"Pattern recognition"—Wikipedia, the free encyclopedia, http://wikipedia.org/wiki/Pattern_recognition, 3 pages, downloaded Jun. 18, 2008.

"Unsupervised learning"—Wikipedia, the free encyclopedia, http://wikipedia.org/wiki/Unsupervised_learning, 2 pages, downloaded Jun. 18, 2008.

"A priori (statistics)"—Wikipedia, the free encyclopedia, http://wikipedia.org/wiki/A_priori, 2 pages, downloaded Jun. 18, 2008.

"Supervised learning"—Wikipedia, the free encyclopedia, http://wikipedia.org/wiki/Supervised_learning, 4 pages, downloaded Jun. 18, 2008.

"Markov property"—Wikipedia, the free encyclopedia, http://wikipedia.org/wiki/Markov_property, 1 page, downloaded Jun. 18, 2008.

"A tutorial on Clustering Algorithms-K-Means clustering"—http://home.dei.polimi.it/matteucc/Clustering/tutorial_html/kmeans.html, 3 pages, downloaded Jun. 18, 2008.

Hofte, et al., "Context-aware communication with Live Contacts", https://doc.telin.nl/dscgi/ds.py/Get/File-42930/Context-aware_communication_with_Live_Contacts.pdf, 3 pages, Oct. 6, 2004.

Marmasse et al., "WatchMe: communication and awareness between members of a closely-knit group", http://ttt.media.mit.edu/research/WM_ubi04.pdf, 18 pages, 2004.

Notice of Allowance dated Apr. 7, 2011 from U.S. Appl. No. 12/106,237.

Office Action dated Feb. 10, 2011 from U.S. Appl. No. 12/041,389.

Cho et al., "Minimum Sum-Squared Residue Co-clustering of Gene Expression Data", Department of Computer Sciences, University of Texas 2004, Downloaded Jan. 31, 2011.

Office Action in U.S. Appl. No. 12/106,237, mailed Oct. 27, 2010.

Final Office Action dated Jun. 23, 2011 from U.S. Appl. No. 12/041,389.

Notice of Allowance dated Jul. 25, 2011 from U.S. Appl. No. 12/106,237.

* cited by examiner

IDENTIFYING AND RECOMMENDING POTENTIAL USES OF COMPUTING SYSTEMS BASED ON THEIR PATTERNS OF USE

CROSS-REFERENCE TO RELATED APPLICATION

This application claims priority under 35 U.S.C. §119(e) from U.S. Provisional Patent Application No. 60/965,963, filed on Aug. 22, 2007, which is hereby incorporated by reference herein in its entirety and for all purposes.

This application also claims priority under 35 U.S.C. §119 (e) from U.S. Provisional Patent Application No. 60/981,812, filed on Oct. 22, 2007, which is hereby incorporated by reference herein in its entirety and for all purposes.

This application is a continuation-in-part of and claims priority to commonly owned and U.S. patent application Ser. No. 12/041,389, entitled "DETERMINING SITUATIONAL PATTERNS OF USE FOR COMPUTING SYSTEMS," filed on Mar. 3, 2008, which is hereby incorporated by reference herein in its entirety and for all purposes.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example, a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to relatively inexpensive microprocessors or computer chips provided, for example, in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred to where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Ope Mobile Alliance (OMA).

The popularity of computing systems, especially mobile communication devices is evidenced by their ever increasing use in everyday life. Accordingly, techniques that can enhance computing systems and/or their use would be very useful.

SUMMARY OF THE INVENTION

Broadly speaking, the invention relates to techniques for improving computing systems and their use. More particularly, the invention pertains to techniques for identifying potential uses of computing systems. It will be appreciated that identifying potential uses of a computing system, among other things, can improve the manner in which the computing system is used by allowing more intelligent decisions and better choices to be made regarding its use. By way of example, applications (or tasks or services) that are likely (or more likely) to be used by a person in a particular situation can be identified as potential use of a particular device. Such potential uses can, for example, be made more accessible (or more readily available) and/or effectively recommended (or automatically initiated), thereby allowing a person to more conveniently use the device.

In accordance with one aspect of the invention, a potential use of a computing system can be identified by considering the context that effectively represents a particular situation for the computing system, and further considering at least one known situation as a match for that situation ("a matching situation"). A known situation can, for example, be associated with a known state of use of the computing system associated with a particular situation. As such, a potential state of use of a computing system can be identified based on one or more known states of use associated with one or more matching situations that are considered to be a match for a particular situation.

By way of example, the current context of a computing system can be determined at a given time as a current situation for the computing system and effectively compared with one or more known situations that are respectively associated with one or more known states of use of the computing system in accordance with one embodiment of the invention. Then, at least one of the known situations can be identified as a "matching situation" for the current situation. Generally, a matching situation can be associated with a corresponding known state of use of the computing system. As such, a potential state of use can be identified based on one or more corresponding known states of use associated with one or more situations that are considered to be a match for the current situation (one or more matching situations).

As noted above, a known state of use can be identified as a potential state of use. However, more generally, a potential state of use for a particular situation can be determined based on one or more known states of use which are associated with a situation that matches or is similar to that particular situation. Identifying a potential state of use, among other things, allows making various tasks, applications and/or services more accessible and/or effectively recommending them for use in various situations so that at a given situation what is more likely to be used and thus more useful can be provided. As a result, the manner in which computing systems are used can be enhanced. In particular, the ability to predict the manner in which a mobile device is likely to be used can dramatically improve the user experience. Situational patterns of date may be determined. Additionally, an assessment of the accuracy of recommendation may be made to provide feedback without requiring supervised training or direct feedback from a user of the computing system.

In accordance with another aspect of the invention, a match for a situation ("matching situation") can be determined based on (a) situational pattern of use data and/or (b) integrated state and contextual usage data. It will be appreciated that (a) situational pattern of use data and/or (b) integrated state and contextual usage data can be used to generate situational pattern of use data. Generally, a situational pattern of use can be determined based on the situations encountered by the computing system as the situations occur without having to predefine a set of situations. Furthermore, a situation can be determined and/or defined based on the context of use of the computing system when or as the use occurs. The context of use can, for example, be determined based on one or more contextual variables and/or parameters including device internal and external variables such as, for example, the physical environment where a device is used and biological data associated with a person using the device. In addition to the context of use, a state of use can be determined for the computing system. The state of use can, for example, be determined based on the state (or status) of one or more components of the computing system (e.g., the state of one or more active applications, tasks and/or services used or being used by person). Similar to the context of use, the state of use can be determined as the use occurs without having to pre-define potential uses of the computing system (e.g., there is no need to predefine or know the applications that will be used on a device).

Moreover, the state of use can be effectively connected to (or associated with) the context of use defining a situation in which the state of use has occurred. This allows determining a pattern of use of the computing system at least based on the association of the state of use with a situation effectively defined (or represented) by the contextual usage data which can be obtained when and as the use occurs. In other words, the state of use of the computing system (e.g., the state of one or more applications, tasks and/or services being used, such as, for example, the state of a word processor) can be determined and connected to the context of the use (e.g., contextual variables such as, for example, temperature, physical location, heart beat of the person using the device). Generally, a state of use can be defined as simply as desired (e.g., application active or not) or it can be defined using very complex variables to provide as much information about the state of use as desired, as will be readily appreciated by those skilled in the art. For example, a state of use can include additional information pertaining to the state of use and/or manner of use (e.g., information pertaining to the use of one or more applications and/or tasks, such as, for example, parameters used to initiate an application, how long an application has been open and what files it has opened, what number has been called and the duration of each call made by an communication application, input/output parameters such as pressure and speed provided in connection with an application).

It should be noted that a situation can also be defined based on the state (or status) of one or more usable components of the computing systems (e.g., one or more applications and/or tasks). In other words, the state of use of one or more usable components (e.g., one or more designated applications) can also be considered in addition to other contextual variables (e.g., temperature) in defining a situation. As such, one or more usable components can be effectively defined as context of use (or a part of the context of use), for example, for one or more other usable components. By way of example, the state of use of a first group of applications can be used as context variables combined with other context variables (e.g., environmental variables) in order to define a situation for a second group of applications (i.e., define a situation associated with state of use of the second group of applications).

The invention can be implemented in numerous ways, including, for example, a method, an apparatus, a computer readable medium, and a computing system (e.g., a computing device). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
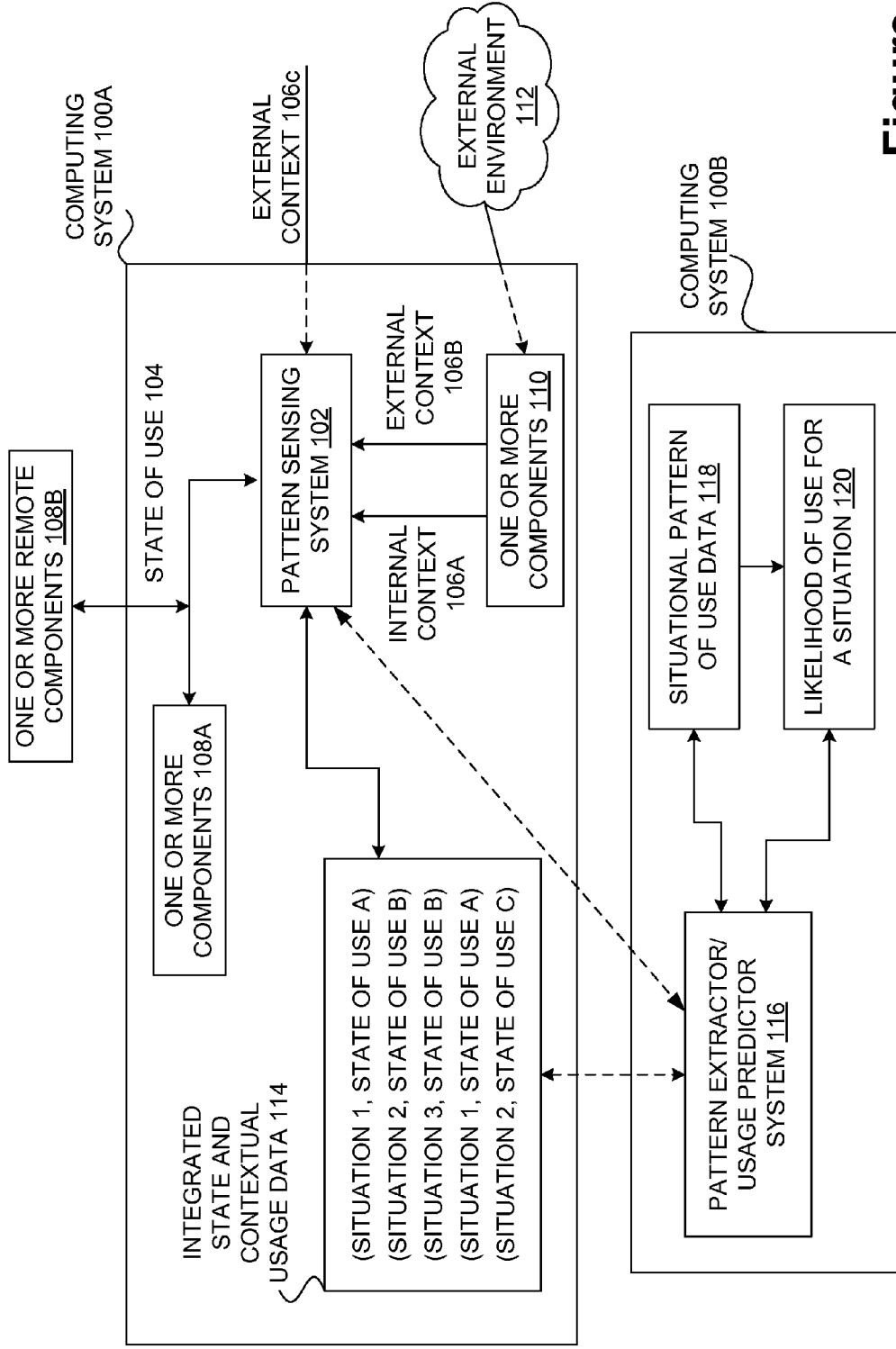
FIG. 1A depicts computing systems in accordance with various embodiments of the invention.

As noted in the background section, mobile computing devices have become increasingly more popular in recent years. Today, wireless, mobile, and/or portable communication devices (e.g., Smartphones, cell phones, Personal Digital Assistants) are especially popular. In recent years, mobile devices have evolved to provide increasingly more functions. As such, wireless and/or mobile communication devices (e.g., cell phones, SmartpPhones) are available today which can offer functionality traditionally offered by Personal Computers (PCs).

Despite these advances, mobile (or portable) devices still need to work with relatively smaller input/output devices (e.g., displays, screens, keyboards). As such, the enhanced processing power and functionality provided by the newer mobile devices has ironically resulted in frustrating some individuals as it has become increasingly more difficult to navigate through numerous applications, functions, menus and services. As a result, extensive efforts have been made by a number of entities to develop alternative techniques for interacting with mobile devices.

One approach is to allow the users to set their preferences individually. However, this approach does not fully realize that preferences may vary from one situation to the next. For example, an individual may have a different set of preferences at home than those preferred at the office. Also, the same individual may have an entirely different set of preferences for using a mobile device on: a cold raining day as opposed to a worm sunny day, an unusual weekday at home versus a regular weekday at work, or an occasional Saturday at work, and so on.

Other approaches require the user to effectively train the device over a period of time ("supervised training"). However, supervised training may not be an ideal or a desired solution for many applications as it generally requires a person to spend a significant amount of time and effort to actively train the device as the device is being used. Another drawback is that conventional approaches are not flexible or do not readily adapt to changes in preferences, environments, or habits associated with the use of the device. Therefore, improved techniques for enhancing mobile devices and/or their use are needed. More generally, techniques the can generally enhance computing systems and/or their use would be very useful.

Accordingly, the invention pertains to techniques for identifying potential uses of computing systems. It will be appreciated that identifying potential uses of a computing system, among other things, can improve the manner in which the computing system is used by allowing more intelligent decisions and better choices to be made regarding its use. By way of example, applications (or tasks or services) that are likely (or more likely) to be used by a person in a particular situation can be identified as potential use of a particular device. Such potential uses can, for example, be made more accessible (or more readily available) and/or effectively recommended (or automatically initiated), thereby allowing a person to more conveniently use the device.

In accordance with one aspect of the invention, a potential use of a computing system can be identified by considering the context that effectively represents a particular situation for the computing system, and further considering at least one known situation as a match for that situation ("a matching situation"). A match need not necessarily be an exact match but can, for example, represent a situation that is considered to be similar. A match can merely be a situation that is known and identified based on one or more criteria. A known situation can, for example, be associated with a known state of use of the computing system associated with a particular situation. As such, a potential state of use of a computing system can be identified based on one or more known states of use associated with one or more matching situations that are considered to be a match for a particular situation.

By way of example, the current context of a computing system can be determined at a given time as a current situation for the computing system and effectively compared with one or more known situations that are respectively associated with one or more known states of use of the computing system in accordance with one embodiment of the invention. Then, at least one of the known situations can be identified as a "matching situation" for the current situation. Generally, a matching situation can be associated with a corresponding known state of use of the computing system. As such, a potential state of use can be identified based on one or more corresponding known states of use associated with one or more situations that are considered to be a match for the current situation (one or more matching situations).

As noted above, a known state of use can be identified as a potential state of use. However, more generally, a potential state of use for a particular situation can be determined based on one or more known states of use which are associated with a situation that matches or is similar to that particular situation. Identifying a potential state of use, among other things, allows making various tasks, applications and/or services more accessible and/or effectively recommending them for use in various situations so that at a given situation what is more likely to be used and thus more useful can be provided. As a result, the manner in which computing systems are used can be enhanced. In particular, the ability to predict the manner in which a mobile device is likely to be used can dramatically improve the user experience.

In accordance with another aspect of the invention, a match for a situation ("matching situation") can be determined based on (a) situational pattern of use data and/or (b) integrated state and contextual usage data. It will be appreciated that (a) situational pattern of use data and/or (b) integrated state and contextual usage data can be used to generate situational pattern of use data. Generally, a situational pattern of use can be determined based on the situations encountered by the computing system as the situations occur without having to predefine a set of situations. Furthermore, a situation can be determined and/or defined based on the context of use of the computing system when or as the use occurs. The context of use can, for example, be determined based on one or more contextual variables and/or parameters including device internal and external variables such as, for example, the physical environment where a device is used and biological data associated with a person using the device. In addition to the context of use, a state of use can determined for the computing system. The state of use can, for example, be determined based on the state (or status) of one or more components of the computing system (e.g., the state of one or more active applications, tasks and/or services used or being used by person). Similar to the context of use, the state of use can be determined as the use occurs without having to predefine potential uses of the computing system (e.g., there is no need to predefine or know the applications that will be used on a device).

Moreover, the state of use can be effectively connected to (or associated with) the context of use defining a situation in which the state of use has occurred. This allows determining a pattern of use of the computing system at least based on the association of the state of use with a situation effectively defined (or represented) by the contextual usage data which can be obtained when and as the use occurs. In other words, the state of use of the computing system (e.g., the state of one or more applications, tasks and/or services being used, such as, for example, the state of a word processor) can be determined and connected to the context of the use (e.g., contextual variables such as, for example, temperature, physical location, heart beat of the person using the device). Generally, a state of use can be defined as simply as desired (e.g., application active or not) or it can be defined using very complex variables to provide as much information about the state of use as desired, as will be readily appreciated by those skilled in the art. For example, a state of use can include additional information pertaining to the state of use and/or manner of use (e.g., information pertaining to the use of one or more applications and/or tasks, such as, for example, parameters used to initiate an application, how long an application has been open and what files it has opened, what number has been called and the duration of each call made by an communication application, input/output parameters such as pressure and speed provided in connection with an application).

It should be noted that a situation can also be defined based on the state (or status) of one or more usable components of the computing systems (e.g., one or more applications and/or tasks). In other words, the state of use of one or more usable components (e.g., one or more designated applications) can also be considered in addition to other contextual variables (e.g., temperature) in defining a situation. As such, one or more usable components can be effectively defined as context of use (or a part of the context of use), for example, for one or more other usable components. By way of example, the state of use of a first group of applications can be used as context variables combined with other context variables (e.g., environmental variables) in order to define a situation for a second group of applications (i.e., define a situation associated with state of use of the second group of applications).

Embodiments of these aspects of the invention are discussed below with reference to FIGS. 1A-7B. However, those skilled in the art will readily appreciate that the detailed description given herein with respect to these figures is for explanatory purposes as the invention extends beyond these limited embodiments.

FIG. 1A depicts computing systems 100A and 100B in accordance with various embodiments of the invention. Those skilled in the art will appreciate that the computing systems 100A and/or 100B can, for example, be a computing device that includes one or more processors and memory (not shown). As such, the computing system 100A and/or 100B can, for example, be a general purpose computer, server, mobile device, mobile phone, and so on.

Referring to FIG. 1A, the computing system 100A effectively includes a pattern sensing system 102 adapted for, and/or capable (or operable) of obtaining a state (or status) of use 104 and contextual information (context) 106. Typically, the state of use 104 is associated with and can be determined based on the state (or status) of one or more components 108 of the computing system 100A. The components 108 can include internal (108A) and remote (108B) components. The one or more components 108 can, for example, be one or more operational and/or executable components and/or usable components (e.g., one or more application programs being executed on the computing system 100A).

Similarly, the context 106 obtained by the pattern sensing system 102 can be associated and/or determined by or based on one or more components 110. As such, the component(s) 108 can be the same as the component(s) 110 or one or more different components. Generally, the pattern sensing system 102 obtains a context (e.g., a context of use) for the computing system 100A which can represent a situation for the computing system 100A. The context can be determined based on various internal and external factors including the state of use of one or components 108A. By way of example, the one or more components 110 can determine (e.g., measure) one or more factors, elements or variables associated with an external environment 112 and provide them to the pattern sensing system 102. As another example, internal context 106a representing the context of use of the computing system 100A may also be determined by and/or based on one or more components 108A and/or 110 and provided to the pattern sensing system 102. It should be noted that external context 106c can also be received, for example, directly from one or more other external components (not shown) and processed by the pattern sensing system 102. As such, the context of use of one or more components 108 and/or 110 and other context information 106 can both be considered by the pattern sensing system 102 in determining a situation.

In any case, the pattern sensing system 102 processes the state of use information 104 and contextual information 106 in order to generate integrated state and contextual usage data 114. It will be appreciated that the pattern sensing system 102 can effectively represent the contextual information 106 as the situation associated with the state of use 104. As such, the integrated state and contextual usage data 114 can effectively include a set of situations (e.g., situation 1, situation 2, and situation 3) with their respective (or associated) states of use (e.g., state of use A, state of use B, state of use C). By way of example, the integrated state and contextual usage data 114 can effectively indicate that in a first situation, (situation 1), the computing system 100A has been in a first state of use (state of use A), and so on. As result, the integrated state and contextual usage data 114 allows determining a pattern of use for the computing system 100A based on the association of a state of use with a particular situation in which the state of use has been effectively observed.

More particularly, the pattern extractor/usage predictor system 116 can effectively obtain the integrated state and contextual usage data 114 in order to determine the situational pattern of use data 118 based on the association of the state of use and the situation in which the use has been observed. It will be appreciated that the pattern extractor/usage predictor system 116 can use the situational pattern of use data 118 for many applications. By way of example, the situational pattern of use data 118 can be used to determine the likelihood of use 120 of the computing system 100A for a particular situation. As such, the likelihood of use 120 can, for example, effectively indicate the probability of the computing system 100A being used in a particular situation (e.g., situation 2) in accordance with a particular state of use (e.g., state of use C).

Those skilled in the art will readily appreciate that the pattern sensing system 102 and pattern extractor/usage predictor system 116 can be combined and provided for a single computing system (e.g., a computing device). In other words, a single computing system can effectively determine the integrated state and contextual usage data 114 and use it to extract the situational pattern of use data 118 for a variety of applications including determining the likelihood of use 120. It should also be noted that the pattern sensing system 102 can be in communication with the pattern extractor/usage predictor system 116. As such, the pattern sensing system 102 can effectively communicate the integrated state and contextual usage data 114. In addition, the pattern extractor/usage predictor system 116 can effectively provide feedback to the pattern sensing system 102, for example, based on the situational pattern of use data 118 and/or the likelihood of use 120, in order to, for example, affect the information gathered by the pattern sensing system 102 including the state of use 104 and contextual information 106.

The pattern extractor/usage predictor system 116 can, for example, determine a pattern of use based on the frequency of occurrence of one or more states of use with respect to one or more situations. It will be appreciated that there is no need to provide the computing system 100A or 100B with supervised training in order to determine a pattern of use (e.g., pattern of use of the computing system 100A). Further, it will be appreciated that the situations effectively represented by the integrated state and contextual usage data 114 need not be predefined prior to their occurrence. In other words, situations can be defined as they occur. As such, the pattern of use data 118 can, for example, be used in a dynamic manner to define and/or affect the information being obtained. Similarly, states of use need not be predefined prior to their occurrence. As a result, the computing systems 100A and 100B can readily adapt to new uses (e.g., new applications) and situations, as well as a change in usage (e.g., a change with respect to applications that are frequently used, use of a device by a different user or a user with different habits) and/or change in situations associated with the use of the computing system (e.g., using a device that has been used in an office at home, moving to a different geographical location).

Figure 1B:
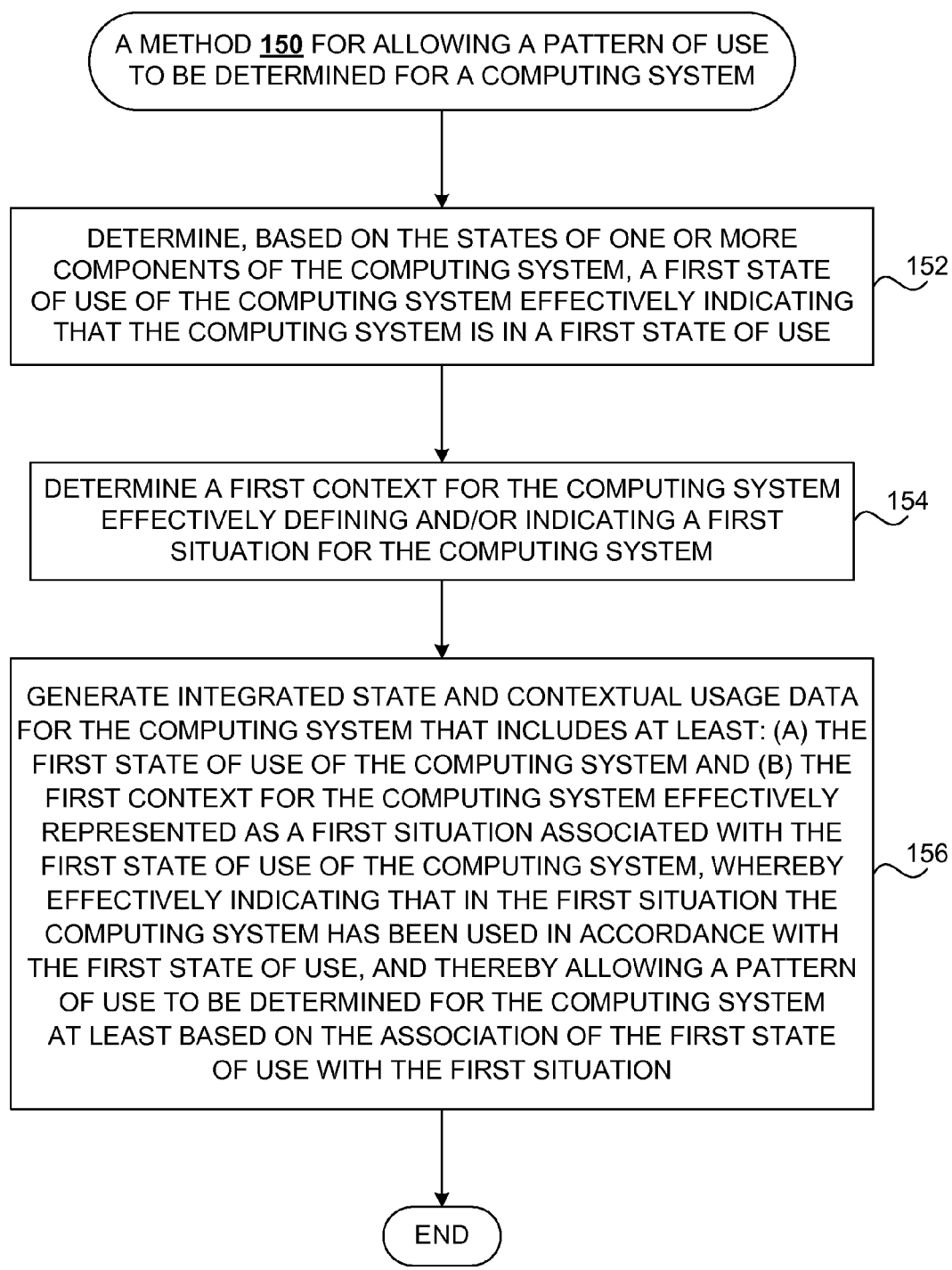
FIG. 1B depicts a method for allowing a pattern of use to be determined for a computing system in accordance with one embodiment of the invention.

FIG. 1B depicts a method 150 for allowing a pattern of use to be determined for a computing system in accordance with one embodiment of the invention. The method 150 can, for example, be performed by the computing system 100A depicted in FIG. 1A. Initially, a first state of use of the computing system is determined (152) based on the state of one or more components of the computing system. The first state of use of the computing system effectively indicates that the computing system is in a first state of use. Next, a first context for the computing system is determined (154). The first context effectively defines a first situation for the computing system. Thereafter, integrated state and contextual usage data for the computing system is generated (156). The integrated state and contextual usage data includes at least the first state of use and first context for the computing system represented as a first situation associated with the first state of use, whereby effectively indicating that in the first situation the computing system has been used in accordance with the first state of use. It will be appreciated that the integrated state and contextual usage data allows a pattern of use to be determined for the computing system at least based on the association of the first state of use with the first situation effectively represented by the first context. The method 150 ends after the integrated state and contextual usage data is generated (156).

Figure 1C:
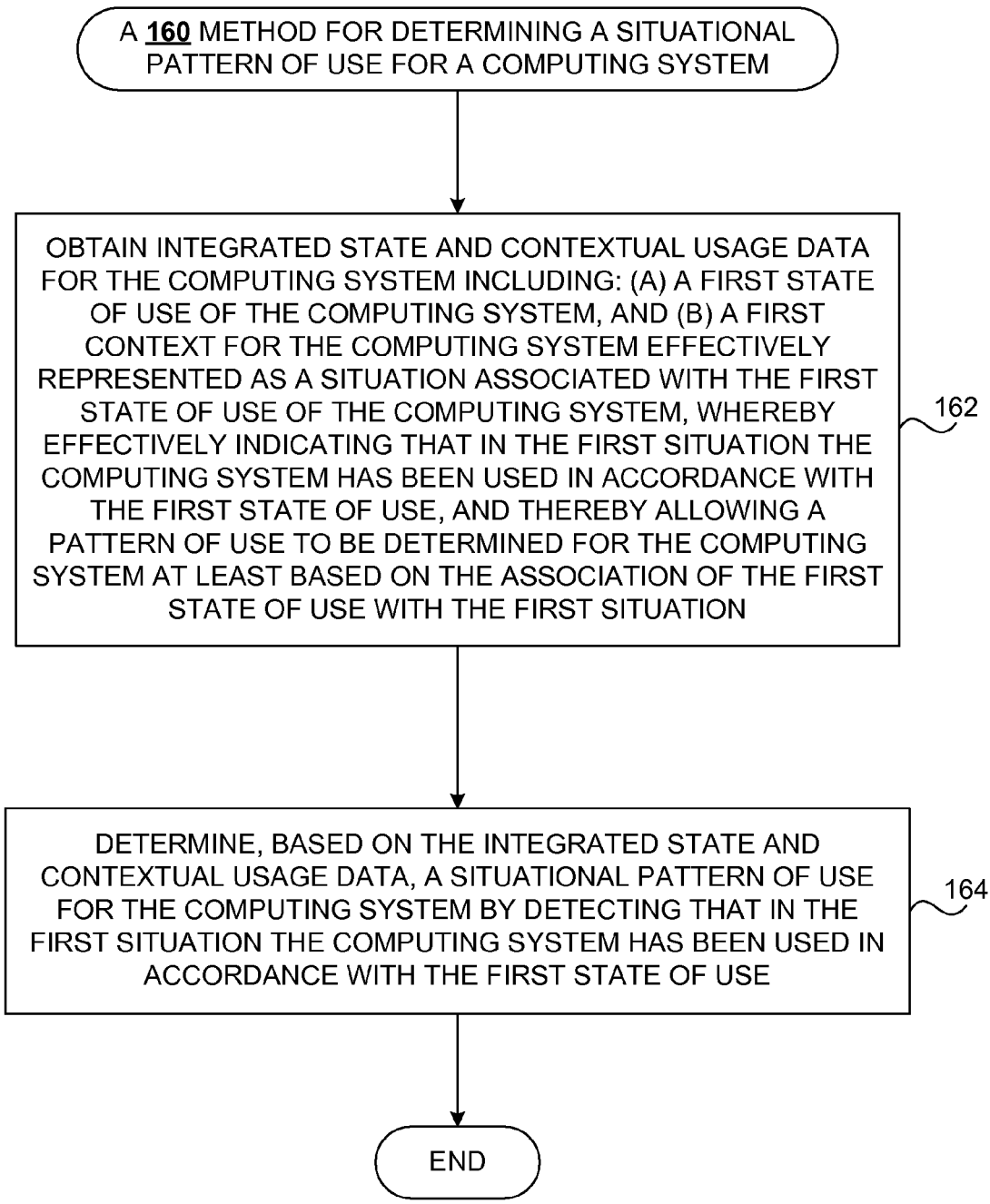
FIG. 1C depicts a method for determining a situational pattern of use for a computing system in accordance with one embodiment of the invention.

FIG. 1C depicts a method 160 for determining a situational pattern of use for a computing system in accordance with one embodiment of the invention. The method 160 can, for example, be performed by computing system 100B shown in FIG. 1A. Initially, integrated state and contextual usage data is obtained (162) for the computing system. The integrated state and contextual usage data includes a first state of use and a first context for the computing system. The first context is effectively represented as a first situation associated with the first state of use of the computing system, whereby effectively indicating that in the first situation, the computing system has been used in accordance with the first state of use. It will be appreciated that the integrated state and contextual usage data allows the pattern of use to be determined for the computing system at least based on the association of the first state of use with the first situation. Accordingly, a situational pattern of use is determined (162) based on the integrated state and contextual usage data by detecting that in the first situation the computing system has been used in accordance with the first state of use. The method 160 ends after the situational pattern of use has been determined (164).

Figure 2A:
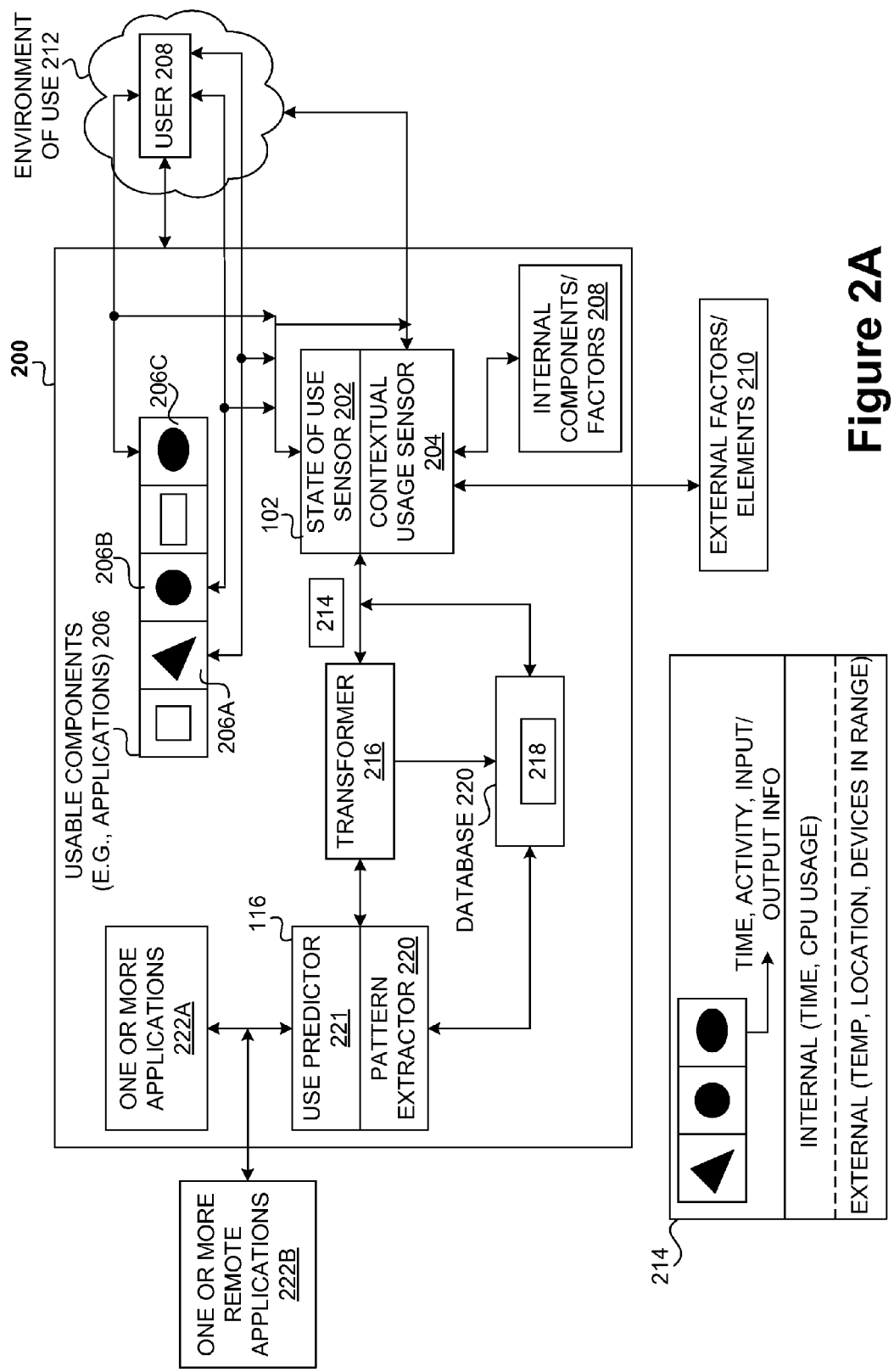
FIG. 2A depicts a computing system in greater detail in accordance with one embodiment of the invention.

As noted above, the pattern sensing system 102 and the pattern extractor/usage predictor system 116 can be effectively combined and provided by the same computing system. To further elaborate, FIG. 2A depicts a computing system 200 in greater detail in accordance with one embodiment of the invention. Referring to FIG. 2A, the computing system 200 effectively provides a pattern sensing system 102 and a pattern extractor/usage predictor 116. The pattern sensing system 102 includes the state of use sensor 202 and the contextual usage sensor 204. The state of use sensor 202 can effectively sense the state of use of one or more usable components 206 of the computing system 200. Generally, the one or more usable components 206 can be one or more hardware and/or software components of the computing system 200. By way of example, the usable components 206 can include one or more application programs that are being effectively used by a user 208 (e.g., one or more persons, one or more end-user application programs, one or more computing components or devices). As such, the state of use sensor 202 can, for example, sense the state of one or more usable components 206 which are active and being used by one or more persons 208 via one or more input/output devices (now shown). Referring to FIG. 2A, the state of use sensor 202 can effectively indicate that one or more usable components 206A, 206B and 206C are active and/or being actively used. In addition, the state of use sensor 202 can effectively indicate the manner in which the active usable components (206A, 206B and 206C) are being used by the user 208. By way of example, the state of use sensor 202 can, for example, indicate the duration of activity for a particular application and/or the manner in which input/output has been provided by the user 208 in connection with the active application, and so on.

Those skilled in the art will readily appreciate that the state of use effectively sensed by the state of use sensor 202 can, for example, include one or more of the following: state of one or more applications (or tasks), state of active use of one or more applications, state of active use including one or more variables associated with the manner in which the one or more applications have been used, state of one or more applications supported on the computing system, state of one or more active applications that are being effectively used on the computing system, and state of one or more active applications that are being effectively used by one or more persons who effectively interact with the one or more active applications via one or more input/output devices.

The other component of the pattern sensing system 102, namely, the contextual usage sensor 204, can effectively determine the context of use of the computing system 200. In general, the context of use determined by the contextual usage sensor 204 can include internal and external components, elements, variables and/or factors 208 and 210, as well the context of use of one or more usable components 206 themselves. As such, the contextual usage sensor 204 can, for example, determine the context of use based on one or more internal components of the computing system (e.g., timers, drivers, software modules) or internal factors and/or elements (e.g., CPU usage, memory available). The contextual usage sensor 204 can also determine the context of use based on a set of external components, variables, factors and/or elements 210 which can include an environment of use 212. Generally, the combination of contextual factors and the usable components 206 can be used to effectively represent a situation for the computing system. By way of example, the status (or status of use) of one or more usable components 206 and various internal and/or external variables can be considered by the context usage sensor 204 in determining the context that effectively represents a situation for the computing system 200.

It will be appreciated that the environment of use 212 can, for example, represent the physical environment associated with one or more persons 208 who are interacting with the one or more active components 206A, 206B and 206C. The context of use can, for example, include one or more of the followings: an environmental factor and/or element, an environmental factor and/or element associated with one or more humans interacting with one or more active applications on said computing system, environmental context of use associated with an environment of one or more humans as they interact with one or more active applications on the computing system, a geographical and/or physical factor and/or element, time, date, location, mode, mode of operation, condition, event, speed and/or acceleration of movement, power and/or force, presence of one or more external components and/or devices, detection of more of more external devices in a determined proximity of said device, detection of one or more active components operating on one or more external devices in a determined proximity of the device, and one or more physiological and/or biological conditions associated with one or more persons interacting with the computing system.

As noted above, a situation can be determined also based on one or more usable components (e.g., one or more applications) that are supported, operational, active and/or being actively used. As such, the context of use can, for example, be determined based on one or more of the following: one or more usable components of a computing system, and one or more usable components of a computing system that are active and/or being used (e.g., one or more applications supported by said computing system, one or more applications of said computing system that are active and/or being used)

The state of use sensor 202 and contextual usage sensor 204 can effectively work together to provide integrated state and contextual usage data 214. Referring to FIG. 2A, the integrated state and contextual usage data 214 can, for example, indicate that a number of usable components are active and additionally provide the state of use for each of the active applications (e.g., a state for each active application). It should also be noted that the state of use can include a set of factors associated with the manner of use of one or more of the active usable components (e.g., time active, input/output data provided in connection with the active components).

In addition to the state of use, the integrated state and contextual usage data 214 provides the context in which the usable components are used. Referring to FIG. 2A, the context includes internal variables (e.g., time, CPU usage) as well as external variables associated with the environment of use 212 (e.g., temperature, location, device that are in range).

It should be noted that the integrated state and contextual usage data 214 can be effectively provided as input to a transformer 216 which transforms the data into a form which is readily available for a pattern extractor 220 which is provided as a part of the pattern extractor/usage predictor 116. The pattern extractor 220 can effectively extract one or more usage patterns as pattern of use data 218 which can be stored in a database 223. A use predictor 221 can effectively use the pattern of use data 218 in order to determine the likelihood of use of the computing system 200. It will be appreciated that the likelihood of use can be effectively provided to one or more internal or remote applications 222 in order to allow them to make certain predications about the use of the computing system 200.

Figure 2B:
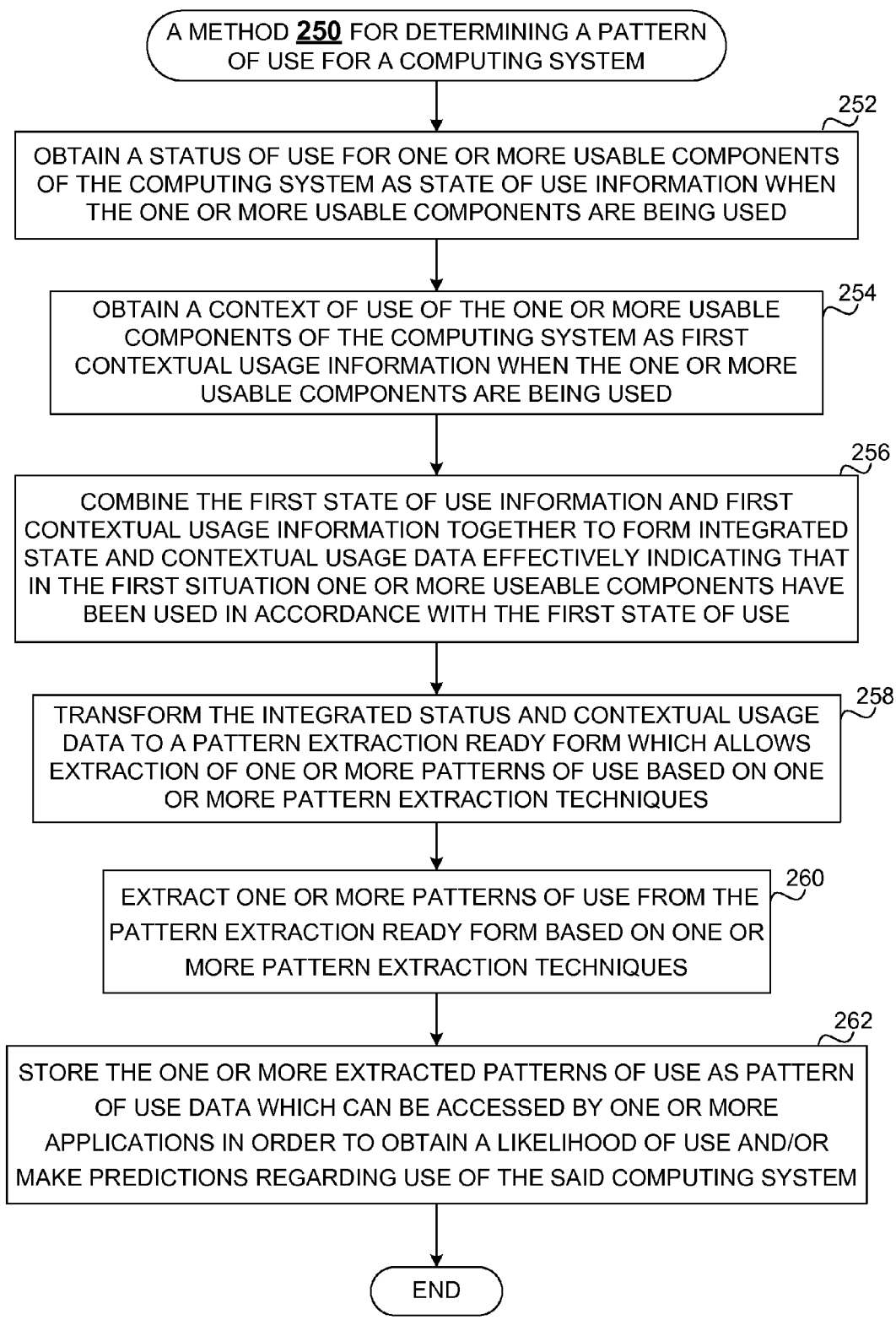
FIG. 2B depicts a method for determining a pattern of use of a computing system in accordance with one embodiment of the invention.

FIG. 2B depicts a method 250 for determining a pattern of use of a computing system in accordance with one embodiment of the invention. The method 250 can, for example, be used by the computing system 200 shown in FIG. 2A. Initially, the state of use for one or more usable components of the computing system is obtained (252) as state of use information when the one or more usable components are being used. In addition, the context of use of the one or more usable components is obtained (254) as first contextual usage information when the one or more usable components are being used. It should be noted that the first contextual usage information effectively defines and/or indicates a first situation in which the one or more usable components have been used. Next, the first state of usage information and the first contextual usage information are combined (256) together to form integrated state and contextual usage data. It will be appreciated that the integrated state and contextual usage data effectively indicates that in the first situation, one or more usable components have been used in accordance with the first state of use. Thereafter, the integrated state and contextual usage data is transformed (258) to a pattern extraction ready form which allows extraction of one or more patterns of use based on one or more pattern extraction techniques. Accordingly, one or more patterns of use are extracted (260) from the pattern extraction ready form based on one or more pattern extraction techniques. Finally, the one or more extracted patterns of use are stored (262) as pattern of use data. It will be appreciated that the pattern of use data can be accessed by one or more applications in order to obtain the likelihood of use and/or make predictions regarding use of the computing system.

Figure 3A:
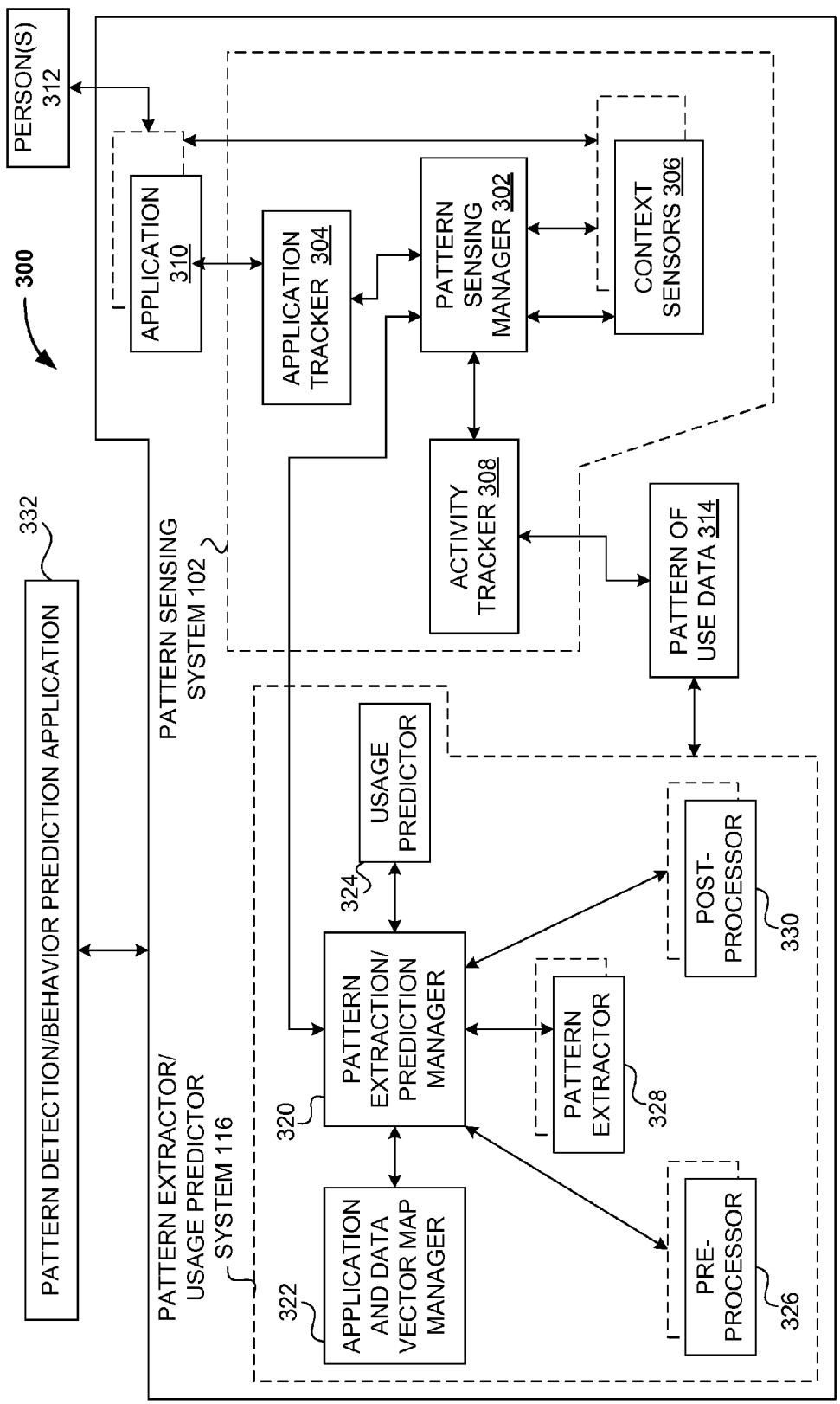
FIG. 3A depicts a computing system in accordance with another embodiment of the invention.

FIG. 3A depicts a computing system 300 in accordance with another embodiment of the invention. Referring to FIG. 3A, a pattern sensing system 102 and a pattern extractor/usage predictor system 116 are effectively provided by the computing system 300. More particularly, a pattern sensing manager 302 effectively manages pattern sensing activities of an application tracker 304, one or more context sensors 306 and an activity tracker 308. The application tracker 304 tracks the activities of one or more application programs 310 which are operating on the computing system 300. The application tracker 304 can provide the state (or status) of use of the one or more application programs 310. The one or more context sensors 306 can effectively provide a context of use of the application programs 310. In other words, a context sensor 306 can sense a context in which one or more applications have been used as a situation. The context of use can, for example, be determined based on various internal and/or external components, factors, elements and/or variables including environmental factors associated with one or more persons 312 who are interacting with one or more applications 310, as well as the state of use of one or more applications 310.

Referring to FIG. 3A, the state of use and context of use of the one or more applications 310 can be provided as input to activity tracker 308 which in turn can transform the information into the pattern of use data 314. The pattern extraction/prediction manager 320 can effectively manage the activities of an application and data vector map manager 322 and a usage predictor 324. Those skilled in the art will appreciate that the application and data vector map manager 322 can effectively select one or more pre-processors 326 depending, for example, on the type of the variables and data used to generate pattern of use data 314, applications 310 and/or end-applications. In other words, the application and data vector map manager 322 can effectively select a pre-processing technique to pre-process the pattern of use data 314 for a particular application and/or in consideration of a particular data format and/or arrangement used to generate data or needed for further processing including pattern extraction. After the pre-processing, the pattern extraction/prediction manager can effectively use one or more appropriate pattern extraction techniques using one or more of the pattern extractors 328 in order to extract a pattern of use from the pattern of use data 314. Similarly, one or more post-processors 330 can effectively perform post-processing in order to, for example, present data in a form which may be suitable for one or more applications. In particular, the usage predictor 324 can effectively use the post-processed data in order to determine the likelihood of use and/or make predictions about the use of the one or more applications 310 in various situations effectively defined and/or identified by the contextual data. Furthermore, the usage predictor 324 can effectively provide information to a pattern detection/behavior prediction application which can use the information for various applications 332.

Figure 3B:
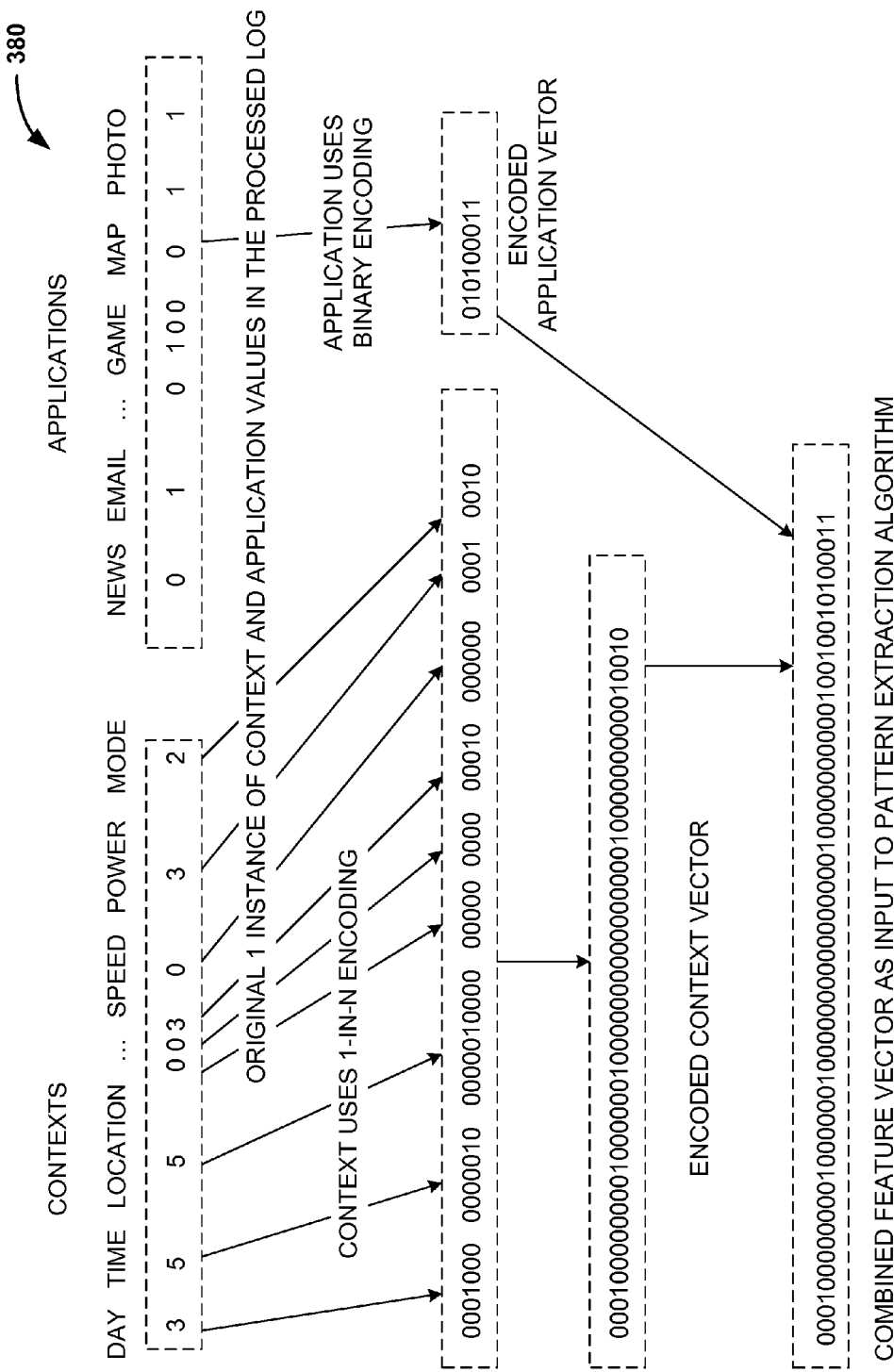
FIG. 3B depicts a process for generating pattern of use data in accordance with one embodiment of the invention

To further elaborate, FIG. 3B depicts a process 380 for generating pattern of use data in accordance with one embodiment of the invention. More particularly, FIG. 3B represents a very simple example where both the applications being used and the context of use (e.g., contextual factor, variables and/or elements) are fixed and known. Referring to FIG. 3B, the following context variables can be considered: location, co-locators, day of week, time of day, temperature, sound, speed, and the power of the device. Further, the following applications can be considered: news, email, music player, game, map, camera, note-taking, Web access, and communicator. User activity can be logged, for example, in a simple log when a user takes an action in connection with an application (e.g., when a user opens an application and starts to interact with the application, user activities in connection with the application can be logged). An entry in the log can, for example, have a timestamp followed by the values of the context variables measured for a particular application. The log can be processed to transform the timestamp into day of week, time of day, and so on. Numerous other transformations can be performed. For example, for enumeration-typed variables, integers can be used to represent the enumerations (e.g., 0 to 6 are used to represent the 7 days in a week). As another example, the range of the values of numerical variables can be divided into intervals and each interval can be represented by an integer, (e.g., sound level 0-20 dB can be represented by 0, 20-40 dB by 1, 40-60 dB by 2, and so on.

An encoded application vector (indicating the state of use of the applications) can be combined with an encoded context vector to provide a combined application and context vector which can be provided to one or more pattern extraction algorithms for pattern extraction, thereby allowing determining situational patterns of use for the applications based on various situations (i.e., contexts) that have been effectively observed and logged for the device.

Those skilled in the art will readily appreciate that various pattern extraction techniques can be used to determine a pattern of use for a computing system in accordance with various embodiments of the invention. By way of example, a co-clustering approach can be used for pattern extraction (e.g., Minimum-Sum Squared Residue Co-clustering (MSS-RCC) technique can be used to capture coherent as well as homogeneous trends latent in a given data matrix.

In accordance with one embodiment of the invention, an innovative co-clustering algorithm can be applied to various applications including pervasive mobile computing. A traditional one-way k-means algorithm with Euclidean distance measure aims at discovering homogeneous patterns over all features, whereas an innovative co-clustering algorithm (e.g., a modified MSSRCC) can employ an alternating minimization scheme to optimize both row and column dimensions simultaneously in accordance with the invention. As such, the innovative co-clustering algorithm can generate co-clusters in a "checkerboard" structure from an input matrix, where a row vector can include both a context part and an application part. The centroids of these co-clusters can then be used for various applications including predicating the use of a mobile device given a particular situation.

In view of the foregoing, it will readily be appreciated that the invention has numerous advantages. For example, one or more of the embodiments of the invention can provide one or more of the following advantages: 1) there is no need for predefining situations to be considered in determining patters of use, 2) there is no need for user-defined profiles, 3) there is no need for supervised training, 4) the invention allows adaptation to changes in patterns of use (e.g., changes in behavior, or environment of use), and 5) virtually an unlimited number of components, factors, elements and/or variables can be considered to determine a situation (i.e., contextual use information associated with state of use information).

It will also be appreciated that the techniques of the invention are especially suitable for mobile systems (e.g., mobile devices). In particular, a "situation" can be effectively defined to be a set of relevant context values that are frequently associated with a pattern of use associated with one or more persons (or users) using a mobile device (i.e., a behavioral pattern of use). A usage history can effectively include user interactions with a mobile device along with the context in which the interactions have occurred. The usage history can be processed to extract patterns of use of the mobile device. Moreover, without requiring the user to provide input in order to effectively train the mobile device (i.e., supervised training), latent patterns of use (behavioral patterns) can be extracted from the usage history. A pattern of use can, for example, include latent situations and tasks frequently performed in the situations as they occur. As such, the pattern of use can provide valuable information including the likelihood of the use of a mobile device in a particular situation (e.g., for a given situation, the likelihood the application is going to be used and/or used in a particular manner can be determined). It will be appreciated that in order to protect user privacy, all that functions needed to extract a pattern of use can run on the mobile device itself.

As noted above, various applications including pattern detection and/or behavior prediction applications 332 can use the integrated state and contextual data 114 and/or situational pattern of use data 118. More generally, likelihood of use of a computing system for a situation can be determined. It will be appreciated that potential uses of a computing system can be identified, made more accessible and/or recommended for use on the computing system.

Figure 4A:
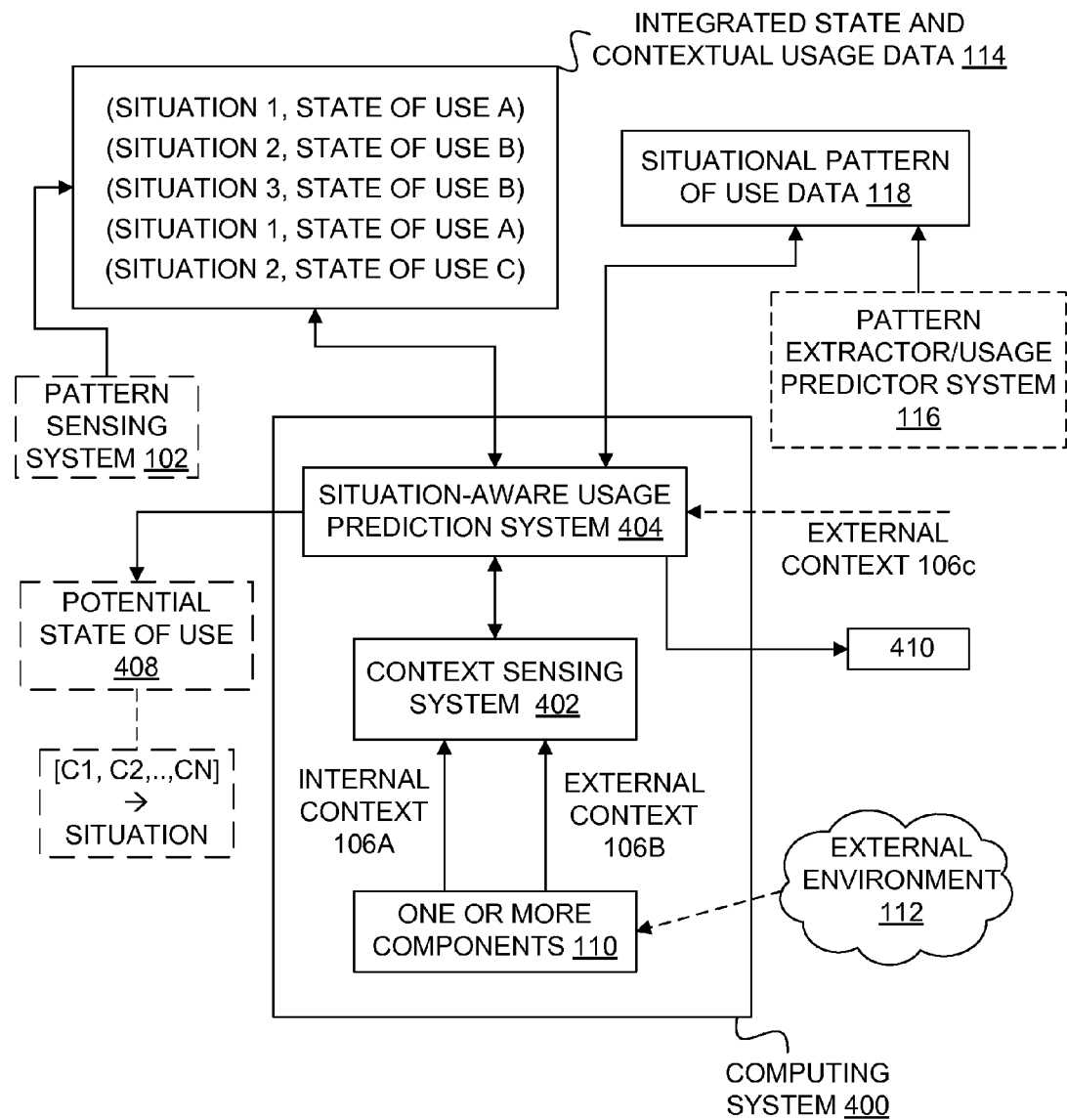
FIG. 4A depicts a computing system capable of identifying a potential use at a given situation in accordance with one embodiment of the invention.

To further elaborate, FIG. 4A depicts a computing system 400 capable of identifying a potential use at a given situation in accordance with one embodiment of the invention. Those skilled in the art will appreciate that the computing systems 100A and/or 100B can, for example, be a computing device that includes one or more processors and memory (not shown). As such, the computing systems 100A and/or 100B can, for example, be a general purpose computer, server, mobile device, mobile phone, and so on.

Moreover, it will be appreciated that the computing system 400 can identify this potential use for its own system and/or another computing system. Referring to FIG. 4A, the computing system 400 includes a context sensing system 402 and a situation-aware usage prediction system 404. The context sensing system 402 can obtain a context which effectively represents a first situation for the computing system 400. This context can, for example, be obtained as the current context. As such, the context sensing system 402 can effectively obtain a current situation for the computing system 400. In other words, the context sensing system 402 can obtain the current context of the computing system 400 at a given point in time as the current situation for the computing system 400 (e.g., a current situation determined for the computer system 400 at a particular time, duration and/or period of time). The context obtained by the context sensing system 402 can be the same and/or obtained in the same manner as the contextual information (contexts) 106 noted above with respect to FIG. 1A. As such, the context 106 obtained by the context sensing system 402 can be associated and/or determined by or based on one or more components 110 of the computing system 400. By way of example, the one or more components 110 can determine (e.g., measure) one or more factors, elements or variables associated with an external environment 112. As another example, internal context 106a representing the context of use of the computing system 400 may also be determined by and/or based on the one or more components 110. Again, it should be noted that external context 106c can also be received, for example, directly from one or more other external components (not shown). The context sensing system can, for example, include the contextual usage sensor 204 shown in FIG. 2A.

Generally, the context sensing system 402 can obtain one or more context variables ($C_1, \ldots, C_n$). The one or more context variables ($C_1, \ldots, C_n$) can effectively represent a situation for the computing system 400 in accordance with one aspect of the invention. A situation can be effectively represented by associating the one or more context values together to effectively represent a situation for the computing system 400. In other words, a situation can be defined and/or determined based on one or more context variables ($C_1, \ldots, C_n$). The representation can be made by the context sensing system 402 and/or the situation-aware usage predication system 404.

In any case, the situation-aware usage predication system 404 can obtain one or more matching situations for a situation effectively represented by the one or more context variables ($C_1, \ldots, C_n$) obtained by the context sensing system 402. In general, a matching situation can be a situation considered to be a match (e.g., identified or selected as a match) for another situation based on one or more criteria. As such, a matching situation need not be an "exact" match but it may, for example, represent a situation considered to be similar to a situation effectively represented by the context. The situation-aware usage predication system 404 can, for example, obtain one or more matching situations from the integrated state and contextual usage data 114 and/or situational pattern of use data 118 (also shown in FIG. 1A). As such, a matching situation can be associated with a corresponding state of use of the computing system 400. In other words, a matching situation (e.g., situation 1) selected as a match for a situation represented by the one or more context variables ($C_1, \ldots, C_n$) (e.g., a current situation) can effectively indicate that the matching situation the computing system 400 has been used in accordance with a particular state of use (e.g., state of use A). In other words, the situation-aware usage predication system 404 can determine, predict, select and/or identify a potential state of use 408 of the computing system 400 for a particular situation represented by one or more context variables ($C_1, \ldots, C_n$) by identifying a match for the situation and its corresponding state of use. Generally, the situation-aware usage predication system 404 can identify, based on one or more matching situations, one or more corresponding states of use as one or more potential states of use of the computing system 400. Referring back to FIG. 4A, the integrated state and contextual usage data 114 can, for example, be generated by the pattern sensing system 102 (also depicted in FIG. 1A). The situational pattern of use data 118 can, for example, be generated by the pattern extractor/usage predictor system 116 (also depicted in FIG. 1A). It will be appreciated that the pattern sensing system 102 and/or pattern extractor/usage predictor system 116 in part or in entirety can be integrated with the computing system 400 as shown below.

It will also be appreciated that the situation-aware usage prediction system 404 can also predict based on one or more matching situations that the computing system 400 is to be used in accordance with one or more potential states of use, recommend, make accessible or more accessible, offer and/or initiate one or more potential states of use for use on the computing system 400. In addition, the situation-aware usage prediction system 404 can assign probabilities of use to one or more potential states of use and identifying a potential state of use with the highest probability as a "likely state of use". As such, a "likely state of use" can, for example, be recommended, offered and/or automatically initiated for use on the computing system 400.

As noted above, the state of use associated with a situation can, for example, include the state of use of a usable component (e.g., one or more applications that are effectively being used by a person). As such, the situation-aware usage prediction system 404 can, for example, recommend and/or offer one or more applications for use on the computing system. It will be appreciated that an application can be offered, recommended, made accessible, made or accessible, and/or automatically initiated in a particular manner (or manner of use) as indicated by the state of use of the application (e.g., a word processor can be offered with a particular set of configuration parameter and/or one or more files opened, a communication application can be offered to dial a particular number).

It should be noted that the situation-aware usage prediction system 404 can also be configured to determine whether a matching situations is known for a situation represented by the one or more context variables ($C_1, \ldots, C_n$). Moreover, if the situation-aware usage prediction system 404 determines that a matching situation is not known, the situation-aware usage prediction system 404 can effectively generate situation-specific relational pattern of use data 410. In other words, the situation-aware usage prediction system 404 can effectively extract a pattern of use for and/or in relation to the situation represented by the one or more context variables ($C_1, \ldots, C_n$). By way of example, integrated state and contextual usage data 114 and/or situational usage data 114 can be effectively regenerated based and/or for the one or more context variables ($C_1, \ldots, C_n$) representing a situation of interest. Those skilled in the art will readily appreciate that the computing system 400 can include one or more processors (not shown) that are adapted for and/or capable (or operable) of performing the operations described above.

Figure 4B:
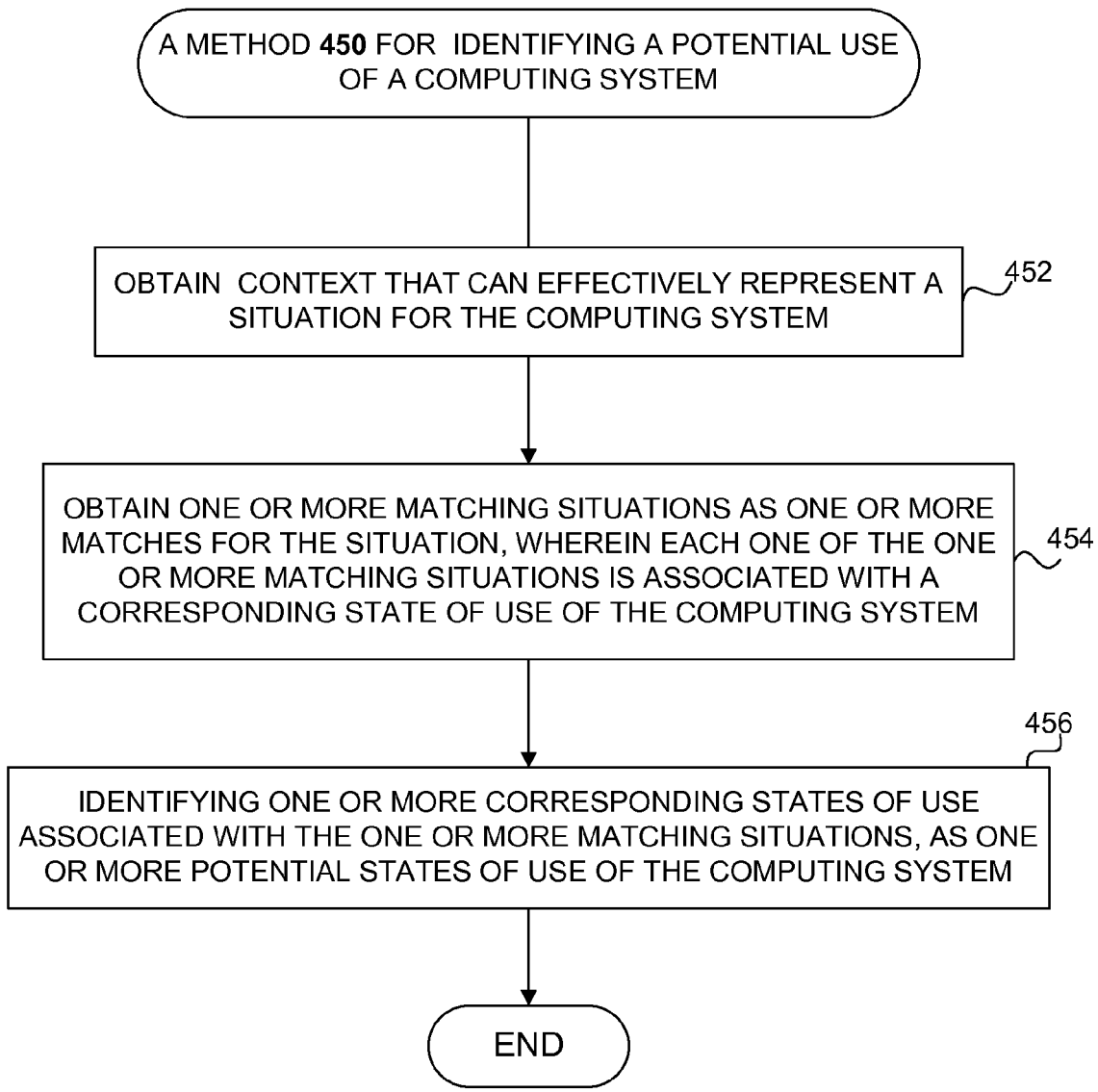
FIG. 4B depicts a method for identifying a potential use of a computing system in accordance with one embodiment of the invention.

FIG. 4B depicts a method 450 for identifying a potential use of a computing system in accordance with one aspect of the invention. The method 450 can, for example, be used by the computing system 400 depicted in FIG. 4A. Initially, a context for the computing system is obtained (452). It should be noted that the context can effectively represent a situation for the computing system. Obtaining of the context can, for example, include: receiving, reading, identifying, selecting and/or determining the context for the computing system.

Next, one or more matching situations are obtained (454) as one or more matches for the situation that can be effectively represented by the context obtained (452). It should be noted that each one of the one or more matching situations is associated with a corresponding state of use of the computing system. This means that the one or more matching situations effectively indicate that at least in a first matching situation the computing system has been used in accordance with a first state of use. Accordingly, one or more corresponding states of use associated with the one or more matching situations are identified (456), as one or more potential states of use of the computing system. It should be noted that obtaining (454) can, for example, include: receiving, reading, identifying, selecting and/or determining one or more matching situation for the situation represented by the context. The method 450 ends after one or more matching situations are identified (456) as one or more potential states of use of the computing system.

Figure 5A:
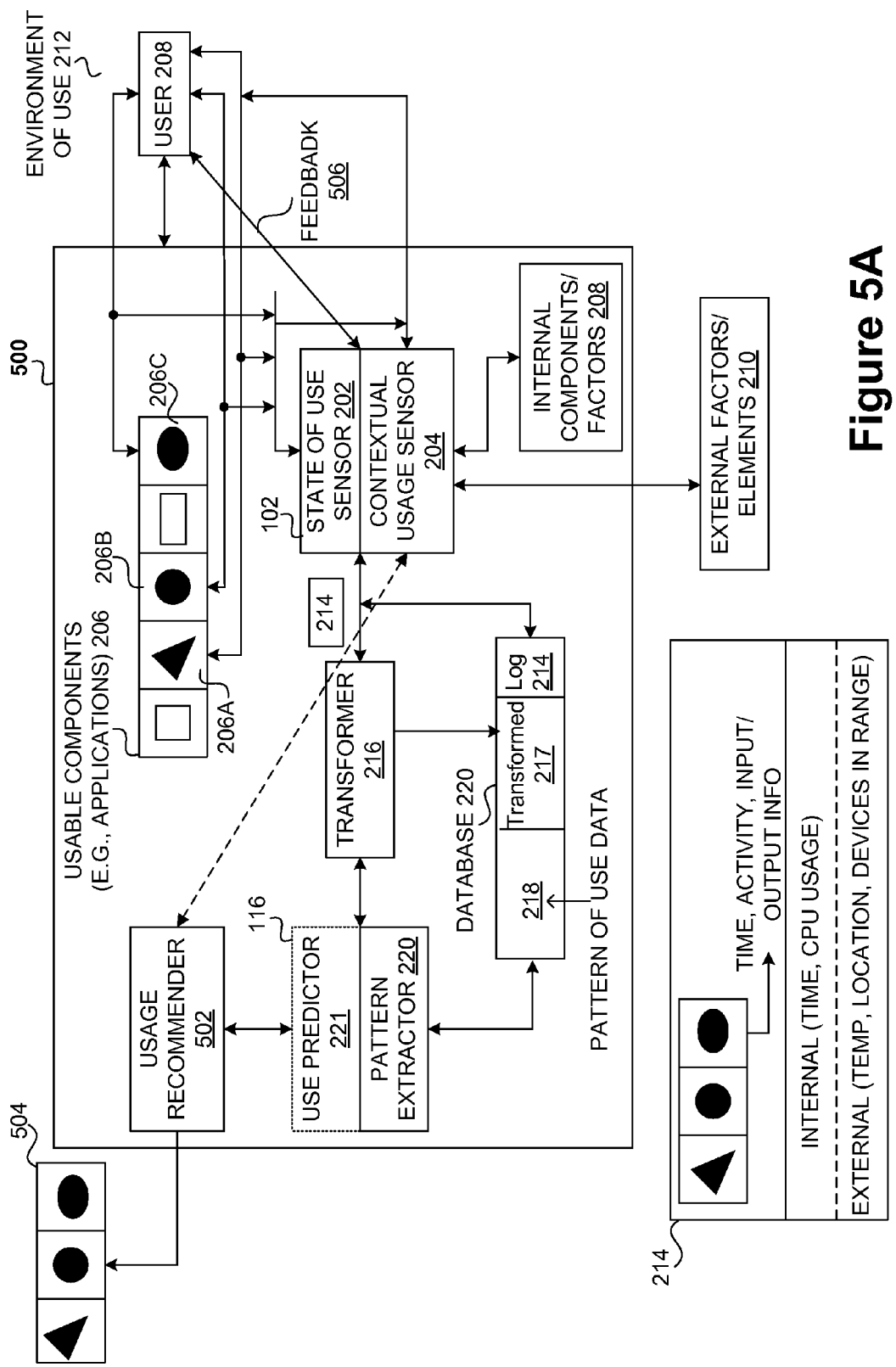
FIG. 5A depicts a computing system in greater detail in accordance with one embodiment of the invention.

As noted above, the pattern sensing system 102 and the pattern extractor/usage predictor system 116 can be effectively provided by the computing system 440 depicted in FIG. 4A. To further elaborate, FIG. 5A depicts a computing system 500 in greater detail in accordance with one embodiment of the invention. Referring to FIG. 5A, the computing system 500 effectively provides a pattern sensing system 102, a pattern extractor/usage predictor 116 and a usage recommender 502. The pattern sensing system 102 and pattern extractor/usage predictor 116 are described with reference to FIG. 2A.

As noted above, the pattern sensing system 102 includes the state of use sensor 202 and the contextual usage sensor 204. The state of use sensor 202 can effectively sense the state of use of one or more usable components 206 of the computing system 200. Generally, the one or more usable components 206 can be one or more hardware and/or software components of the computing system 200. By way of example, the usable components 206 can include one or more application programs that are being effectively used by a user 208 (e.g., one or more persons, one or more end-user application programs, one or more computing components or devices). It should be noted that an application program can, for example, be loaded via a network connection or a computer readable medium (e.g., USB Flash Drive, CD). As such, the state of use sensor 202 can, for example, sense the state of one or more usable components 206 which are active and being used by one or more persons 208 via one or more input/output devices (now shown). The other component of the pattern sensing system 102, namely, the contextual usage sensor 204, can effectively determine the context of use of the computing system 200. In general, the context of use determined by the contextual usage sensor 204 can include internal and external components, elements, variables and/or factors 208 and 210.

Referring to FIG. 5A, the usage recommender 502 can effectively recommend one or more usable components 504 for a situation. The usage recommender 502 can use the contextual usage sensor 204 to obtain a situation for the computing system 500. By way of example, the usage recommender 502 can be configured to request the contextual usage sensor 204 to determine the current situation of the computing system 500. The current situation can, for example, be determined based on one or more context variables ($C_1, \ldots, C_n$). The contextual usage sensor 204 and/or the usage recommender 502 can be configured to determine which context variables are to be determined (e.g., measured).

In any case, the usage recommender 502 can identify one or more matching situations for the situation effectively determined by the contextual usage sensor 204. The one or more matching situations can be determined based on situational pattern of use data 218 pattern that effectively identifies a pattern of use of one or more usable components (e.g., usable components 206) of the computing system 500. As noted above, situational pattern of use data 218 can be determined based on the integrated state and contextual usage data 214 providing the context and state of use of one or more usable components (e.g., usable components 206). Again, it should be noted that the integrated state and contextual usage data 214 can be effectively provided as input to a transformer 216 which transforms the data into a form 217 which is readily available for a pattern extractor 220 which is provided as a part of the pattern extractor/usage predictor 116. The pattern extractor 220 can effectively extract one or more usage patterns as pattern of use data 218 which can be stored in a database 223. As noted above, a use predictor 221 can effectively use the pattern of use data 218 in order to determine the likelihood of use of the computing system 500.

It will be appreciated that the usage recommender 502 can interface directly and/or via the use predictor 221 with the pattern extractor 220 in order to access and/or use the situational pattern of use data 218. More generally, the usage recommender 502 can use the logged (historical) data 214, transformed data 217 and/or the situation pattern of use data 218 to identify one or more matching situations for a particular situation (e.g., a current situation of the computing system 500). Typically, the one or more matching situations are identified based on the pattern of use data 217 stored in the database 220. However, the usage recommender 502 can be configured to effectively cause the pattern of use data to be generated dynamically when there is a need to make a recommendation for a given situation.

It will also be appreciated that the computing system 500 can be configured to consider whether the one or more recommended usable components 504 are used in the situation for which the recommendation is made. In other words, the computing system 500 can determine the accuracy of the recommendations it makes by determining whether the recommended usable components 504 are used as recommended for a particular situation. Referring to FIG. 5A, whether the recommended usable components 504 are used can be effectively provided as feedback 506 to pattern sensing system 102. The feedback 506 can be used to assess the accuracy of the recommendation made and to generate improved situational pattern of use data that takes the feedback 506 into account. By way of example, the use of the recommended usable components 504 as recommended or use of another one or more usable components contrary to the recommendation can be stored in log (or historical) data 214 and subsequently used to generate improved pattern of use data.

Figure 5B:
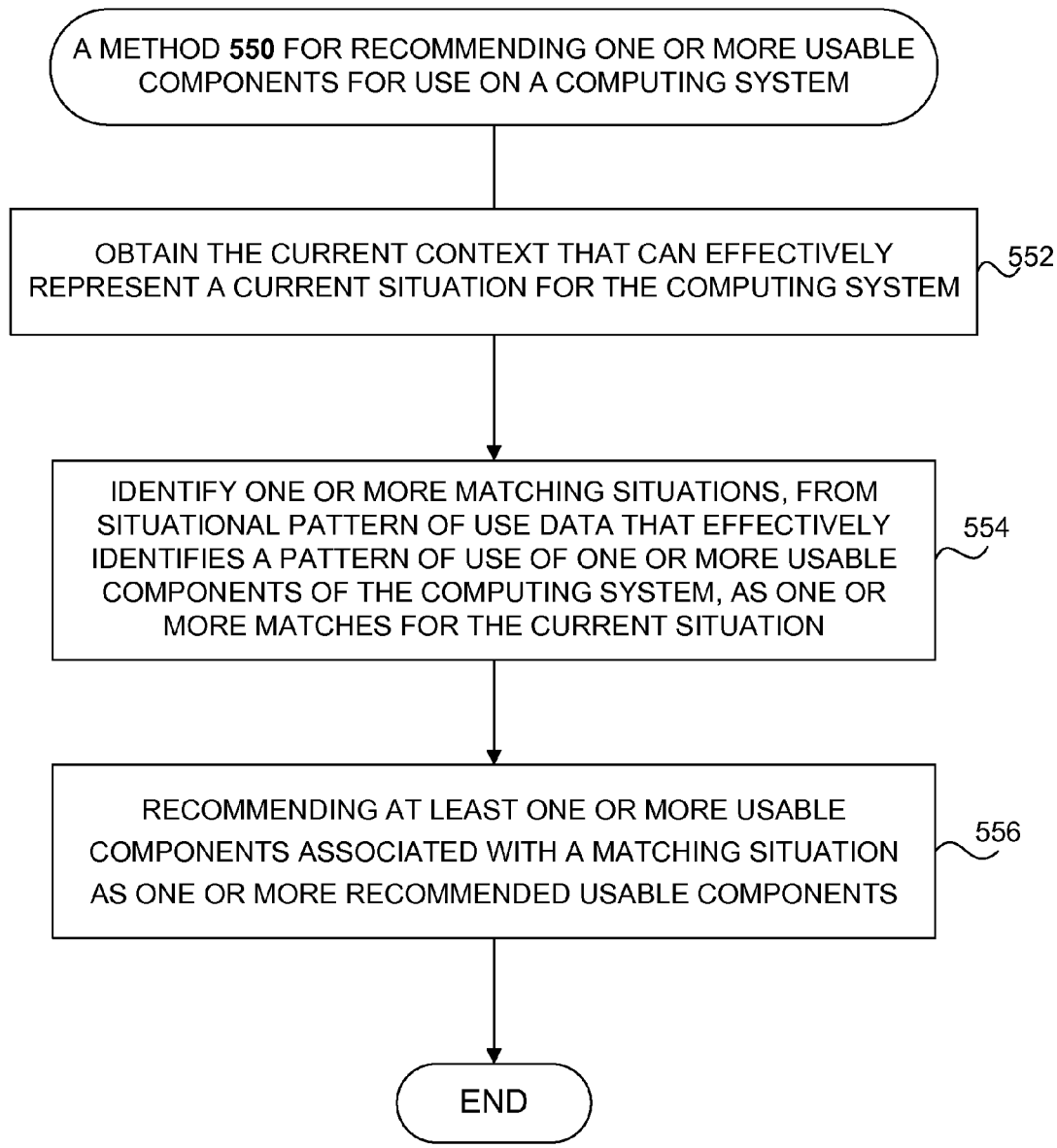
FIG. 5B depicts a method for recommending one or more usable components for use on a computing system in accordance with one embodiment of the invention.

FIG. 5B depicts a method 550 for recommending one or more usable components for use on a computing system in accordance with one embodiment of the invention. The method 550 can, for example, be used by the computing system 500 depicted in FIG. 5A. Initially, a current context for the computing system is obtained (552) as a current situation for the computing system. Next, one or more matching situations are identified (554) for the current situation. It should be noted that the one or more matching situations are identified based on situational pattern of use data that effectively identifies a pattern of use of one or more usable components of the computing system. Typically, each one of the one or more matching situations is associated with a corresponding state of use of one or more usable components of the computing system. As such, the pattern of use data effectively indicates that at least in a first matching situation, a particular one or more usable components (first one or more usable components) have been used in accordance with a particular state of use (a first state of use). Accordingly, one or more usable components associated with a particular matching situation (e.g., a first matching situation) are recommended (556) as one or more recommended usable components. It should be noted that the one or more usable components can be recommended (556) for use in accordance with a particular state of use (e.g., first state of use) which is associated with the corresponding matching situation (e.g., first state of use which is associated with a first situation identifies as a first matching situation). The method 550 ends after at least one or more usable components are recommended (556).

As noted above, the one or more usable components 504 can, for example, include one or more applications. The one or more applications can be executing on the computing system 500 and effectively used by one or more persons. As such, the usage recommender 502 can effectively recommend one or more applications for use by one or more persons who are using the computing system 500. In other words, the usage recommender 502 can be provided as an application task managing system that can recommend applications to the user of a computing device.

Figure 6A:
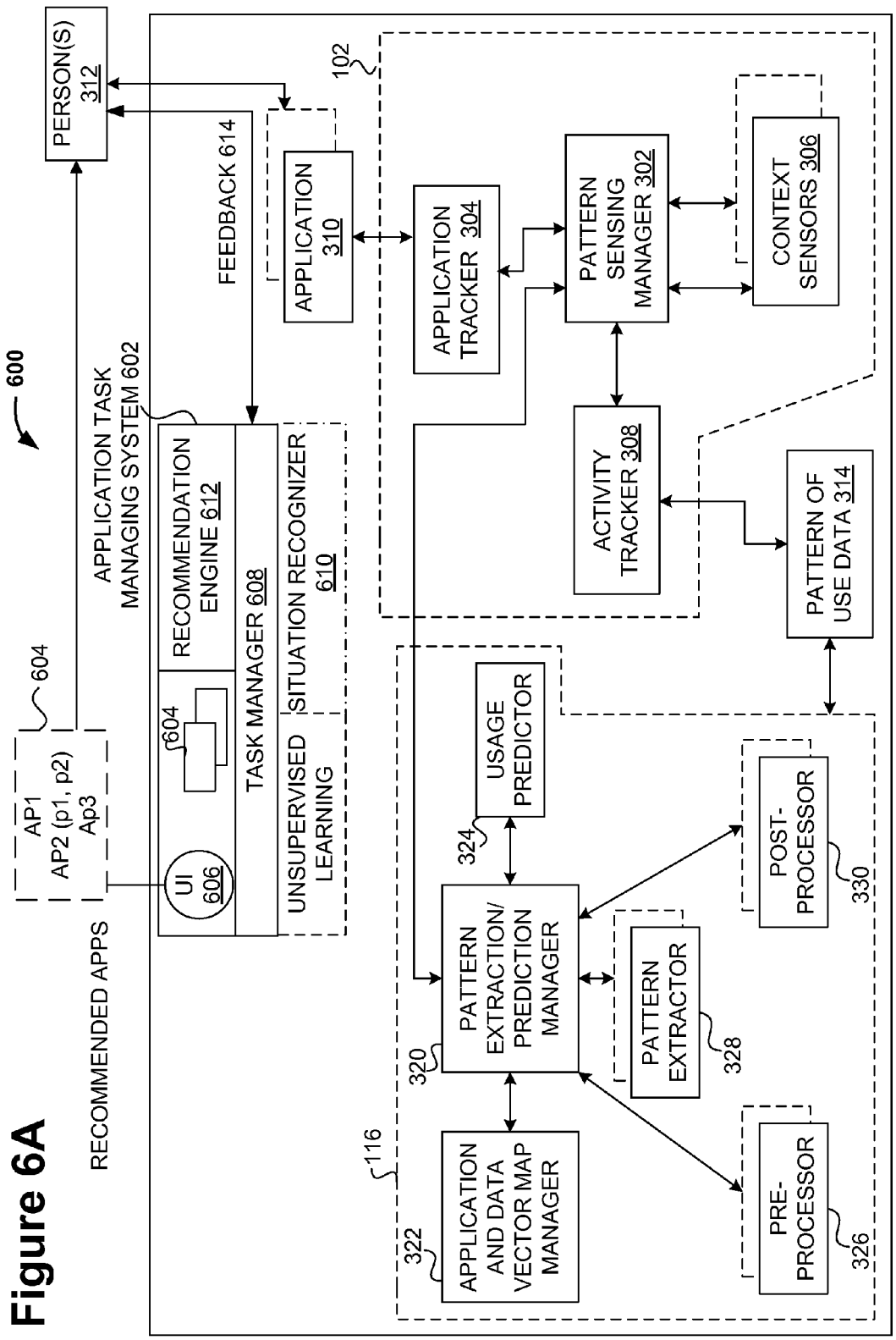
FIG. 6A depicts a computing system which provides an application task manager system in accordance with one embodiment of the invention.

To elaborate even further, FIG. 6A depicts a computing system 600 which provides an application task manager system 602 in accordance with one embodiment of the invention. The application task manager 602 can effectively recommend one or more applications 604 for use by one or more persons 312. The one or more persons 312 can interact with the application task manager 602 via a User Interface (e.g., Graphical User Interface) 606. The User Interface 606 can, for example, include a component (e.g., a button, an icon) that allows the person(s) 312 to request a recommendation to be made. By way of example, by pressing a recommendation button, a person can effectively activate the task manager 608 and make a request for a recommendation for a current situation. The task manager 608 can effectively ask the pattern sensing manager 302 and/or its context sensors 306 to determine the current context based on one or more context variables ($C_1, \ldots, C_n$). The pattern sensing manager 302 and/or its context sensors 306 act as a current context (or current situation) manager in determining the situation when the recommendation is made.

The task manager 606 can effectively obtain situational pattern of use data from the pattern extraction/prediction manger 320. By way of example, the task manager 606 can use of or more obtained context values and its application ID to form a current situation prediction request and send the request to the pattern extraction/prediction manger 320. If learned associations of situations and application usage patterns are already available, the historic associations can be obtained and the similarity of the current contexts with the situations can be determined. Associations whose situations are similar to a particular situation (e.g., current situation determined by current context variables) can be recomputed. If the learned associations are inadequate, one or more pattern extractors 328, pre-processor 326 and/or post-processors 330 that may be better suited can be selected. Subsequently, the trace data that is more relevant and/or better suited can be obtained from the data store and transformed using the selected pre-processor, and then a selected pattern extractor can be used to extract the pattern from the transformed data. The results of the extraction are associations of situations and application usage patterns. This result can be transformed using a selected post processor in order to compute the similarity between the situations effectively identified with the current situation contexts. The situations that are similar to the current situation can be recomputed and the result can be stored The task manger 608 can be configured to receive the results returned from the situation-based pattern extractors 328 and effectively pass the results to the recommendation engine 612 in order to request a recommendation to be made with respect to one or more applications for use in the current situation. The task manger 608 can further transform the data (results provided by the pattern extractors 328) into a form that is more suitable for the recommendation engine 612.

The recommendation engine 612 can choose one or more applications most suitable for the situation as one or more recommended applications 604. Those skilled in the art will readily appreciate that the recommendation engine 612 can be as configured to, for example, simply choose the application patterns whose associated situation is most or least similar to the current context variables (current context representing a current situation). The recommendation engine 612 can also be configured to effectively reason beyond the situations and the application patterns by considering additional factors (e.g., rules) so that the recommended applications 604 can ultimately reflect what is desired and/or needed.

The recommendation engine 612 can provide the task manager 608 with one or more recommended applications 604, which in turn, are provided to the user interface and displayed for the person(s) 312 accordingly (e.g., icons for the recommended applications are displayed for access by the user). When a person 312 chooses an application, either among the recommended applications 604 or applications which are not recommended, the information can be passed through the task manager 608 to the pattern sensing manager 302 which effectively behaves as a current situation (or context) manager. The pattern sensing manager 302 (or a context manager component) will then pass this information together with the context values measured at the time the application were selected for use. The information can be subsequently used by the pattern extractors 328 to make better recommendations. It should be noted that task manager 608 can provide this information also to the recommendation engine 612 so that it can make better recommendations. As such, the action taken by a person 312 in either accepting or rejecting the recommendations made by the application task manager system 602 can be considered as feedback 614.

In effect, the application task managing system 602 can benefit from a situation recognizer 610 that uses unsupervised learning in order to extract latent patterns of situations and their associated tasks which can be stored as log (or historical data). The situation recognizer 610 can also identify historical situations that are similar to the current situation and sends similar situations (or matching situations) along with their associated tasks to the recommendation engine 612. The recommendation engine can also be configured to rank the recommended applications. Referring to FIG. 6A, recommended applications 604 can be ranked. In addition, a particular recommended application can be recommended in accordance with a particular state of use (e.g., a second recommended application A2 can be recommended with the first and second parameters P1 and P2). It should be noted that the context sensed by the context sensors 306 can, for example, include current location identifies configured to detect the current geographical location by, for example, sensing nearby WiFi access points. As another example, co-locators can be used to sense (or identify), for example, nearby devices and/or people by detecting Bluetooth signals.

As noted above, an encoded application vector (indicating the state of use of the applications) can be combined with an encoded context vector to provide a combined application and context vector which can be provided to one or more pattern extraction algorithms for pattern extraction, thereby allowing determining situational patterns of use for the applications based on various situations (i.e., contexts) that have been effectively observed and logged for the device. Also, various pattern extraction techniques can be used to determine a pattern of use for a computing system. By way of example, a co-clustering approach can be used for pattern extraction (e.g., Minimum-Sum Squared Residue Co-clustering (MSSRCC) technique can be used to capture coherent as well as homogeneous trends latent in a given data matrix). Furthermore, an innovative co-clustering algorithm can be applied to various applications including pervasive mobile computing. A traditional one-way k-means algorithm with Euclidean distance measure aims at discovering homogeneous patterns over all features, whereas an innovative co-clustering algorithm (e.g., a modified MSSRCC) can employ an alternating minimization scheme to optimize both row and column dimensions simultaneously in accordance with the invention. As such, the innovative co-clustering algorithm can generate co-clusters in a "checkerboard" structure from an input matrix, where a row vector can include both a context part and an application part. The centroids of these co-clusters can then be used for recommending application or tasks. More particularly, situations that are similar to the current situation (or context) can be identified by computing the Euclidean distances between the current context and the context part of every co-cluster centroids. The application parts of the centroids of the identified similar situations are then used to rank the applications.

Figure 6B:
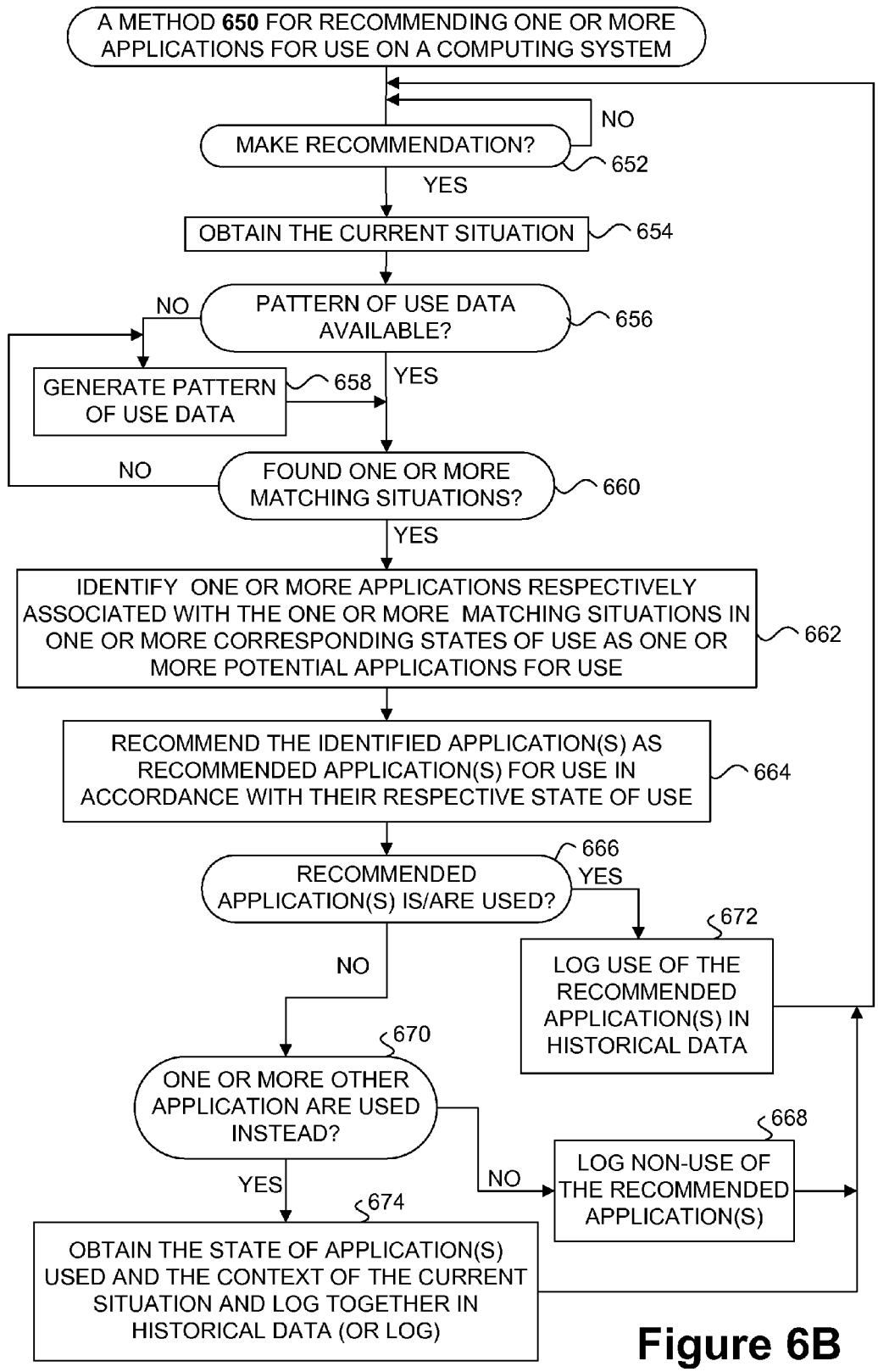
FIG. 6B depicts a method for recommending one or more applications for use on a computing system in accordance with one embodiment of the invention.

FIG. 6B depicts a method 650 for recommending one or more applications for use on a computing system in accordance with one embodiment of the invention. The method 650 can, for example, be used by the computing system 600 shown in FIG. 6A. Initially, it is determined (652) whether to make a recommendation. By way of example, it can be determined (652) whether a request for recommendation has been received, one or more conditions have been met and/or one or more events have occurred. In effect, the method 650 can wait until it is determined (652) to make a recommendation. If it is determined (652) to make a recommendation, a current situation for the computing system is obtained (654) (e.g., a current situation is determined based on one or more context (or contextual) variables). Next, it is determined (656) whether pattern of use data is available. Generally, it can be determined (656) whether any pattern of use data is available and/or whether pattern of use data which is suitable for the current situation is available. If it is determined (656) that pattern of use data (or suitable pattern of use data) is not available, pattern of use data is generated (658). Subsequently, it is determined (660) whether one or more matching (or suitable) situations that match the current situation can be identified from the pattern of use data. If it is determined (660) that no suitable matching situation has been identified, pattern of use data can be generated (658) again. However, if it is determined (660) that one or more matching situations have been identified, one or more applications respectively associated with the one or more matching situations are identified (662). It should be noted that the pattern of use data also effectively identifies the respective one or more states of use of the one or more applications (or tasks or services). As such, one or more states of use respectively associated with the one or more applications (application states) can also be identified (662). Accordingly, the one or more identified (662) applications can be recommended as one or more recommended applications in accordance with their respective states of use as indicated by the one or more matching situations. Thereafter, it is determined (666) whether the one or more recommended applications are used as recommended. Generally, it can be determined whether a recommended application is used and/or whether the recommended application is used in accordance with its recommended state of use. If it is determined (666) that the one or more recommended applications are used as recommended, the use of the one or more recommended applications is logged in historical data (or log). On the other hand, if it is determined (666) that the one or more recommended applications are not used as recommended for the current situation, it is determined (670) whether one or more other applications are used in the current situation instead of the recommended one or more applications. If it is determined (670) that one or more other applications are not used in the current situation instead of the recommended one or more applications, the fact that the recommended one or more applications were not used can be logged (672) in historical data. However, if it is determined (670) that one or more other applications are not used in the current situation instead of the recommended one or more applications, the state of use of the one or more other applications which are used and the current context representing the current situation (e.g., one or more current context variables) is obtained and logged (674) in historical data. In any case, the logged information can be used to generate more accurate pattern of use data and/or improve the reasoning used to recommend applications in order to ultimately provide better recommendations. After logging (668 or 672), the method 650 can determine (652) whether to make a recommendation and can proceeds in a similar manner to recommend (666) one or more applications for use on the computing system.

Figure 7A:
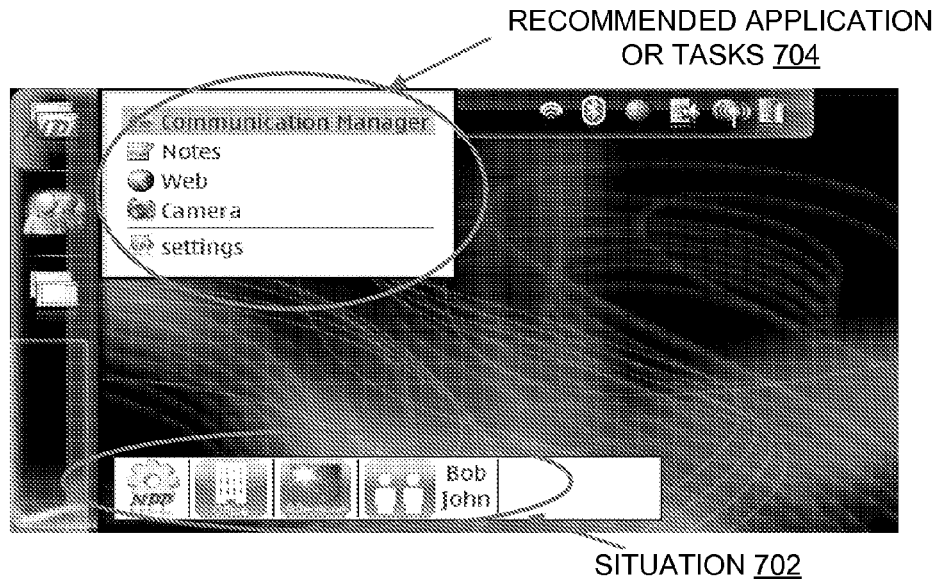
FIGS. 7A and 7B depict exemplary screen shots in accordance with one embodiment of the invention.
Figure 7B:
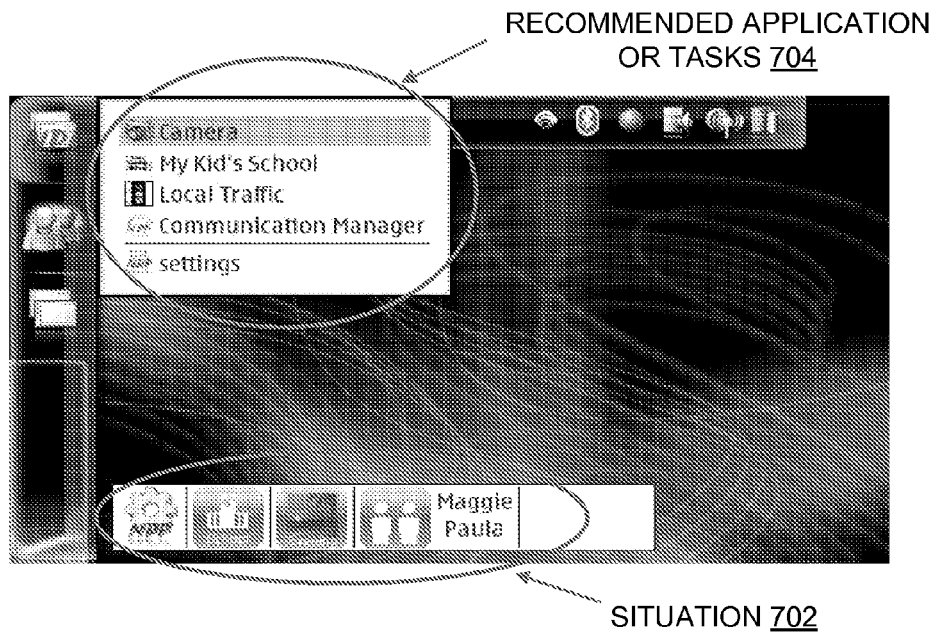

To further demonstrate recommending applications based on situations, FIGS. 7A and 7B depict screenshots representing simple exemplary situations in accordance with the invention. Referring to FIG. 7A, an "office meeting in the afternoon" is depicted using only three (3) simple context variables, namely, time, location, and co-locator information. The applet 702 shows the context of the current situation: "office", "afternoon", and with co-locators identifying two coworkers as "Bob" and "John". In this situation representing an office meeting in the afternoon, a pull-down menu 704 shows that recommended applications or tasks: communication, notes, Web, and camera. The recommendations effectively reflects the behavior of the person using the device, namely, that the person often takes notes, snapshot pictures, and browses the Web during office meetings in the afternoon.

In contrast to FIG. 7A, FIG. 7B depicts a screenshot representing a different situation, namely, "picking up kids at the evening" in accordance with one embodiment of the invention. Referring to FIG. 7B, the applet 702 now shows "school," "evening," and "Maggie" and "Paula." As a result, "camera", "kid school Web site" and "local traffic service" are recommended as preferred applications or tasks 704 in this situation when a person is picking up the kids in the evening rather then attending a meeting in the office in the afternoon.

In view of the foregoing, it will readily be appreciated that the invention is especially useful for mobile devices even though the techniques described above can be applied to any computing system as the techniques have been described for general systems without making any assumptions or requiring specific features to be provided. By way of example, the techniques of the invention can be used to configure a mobile phone to automatically recommend or make accessible various applications and/or tasks by detecting the current situation of the mobile phone.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system comprising a processor and a memory, wherein said computing system is adapted for and/or capable of:
    obtaining a first context for said computing system, wherein said first context can effectively represent a first situation for said computing system;
    obtaining one or more matching situations for said first situation, wherein said one or more matching situations are respectively associated with one or more corresponding states of use of said computing system; and
    determining based on said one or more of said corresponding states of use, one or more potential states of use of said computing system;
    predicting, based on said one or more matching situations, that said computing system is to be used in accordance with said one or more potential states of use and generating a recommendation for at least one state of use;
    assessing the accuracy of a recommendation made based on situational pattern of use data to generate improved situational pattern of use data, thereby effectively providing feedback without requiring supervised training or direct feedback from a user of said computing system.

2. A computing system as recited in claim 1,
    wherein said determining identifies said one or more corresponding states of use of said computing system as one or more potential states of use of said computing system, and
    wherein said one or more corresponding states of use include one or more states of use which have been used by said computing system.

3. The computing system of claim 1, wherein said obtaining obtains said first context as a current context representing a current situation for said computing system.

4. The computing system of claim 1,
    wherein said first context includes one or more context values determined respectively for one or more context variables, and
    wherein said computing system is further adapted for and/or capable of:
    associating and/or combining said one or more context values together to effectively represent said first situation, and
    determining and/or defining said first situation based on said one or more context values.

5. The computing system of claim 1, wherein said first context for said computing system is determined based on one or more of the following:
    one or more internal components of said computing system,
    one or more internal factors and/or elements which are internal to said computing system,
    one or more external components, factors and/or elements that are external to said computing system, and
    one or more states of use of one or more usable components of said computing system.

6. The computing system of claim 1, wherein said first context for said computing system is determined based on one or more of the following:
    an environmental factor and/or element,
    an environmental factor and/or element associated with one or more humans interacting with one or more active applications and/tasks on said computing system,
    environmental context of use associated with an environment of one or more humans as they interact with one or more active applications and/tasks on said computing system,
    a geographical and/or physical factor and/or element;
    time, date, location, mode, mode of operation, condition, event, speed of movement, acceleration of movement, power, and/or force,
    presence of one or more external components and/or devices, detection of more of more external devices in a determined proximity of said device, detection of one or more active components operating on one or more external devices in a determined proximity of said device,
    one or more physiological and/or biological conditions associated with one or more persons interacting with said computing system,
    one or more application and/or task states for one or more applications and/or tasks that are supported by said computing system, and
    one or more application and/or task states for one or more applications and/or tasks that are active and/or being used on said computing system.

7. The computing system of claim 1, wherein said computing system is further adapted and/or capable of one or more of the following:
    predicting based on said one or more matching situations that said computing system is to be used in accordance with said one or more potential states of use;
    recommending and/or offering said one or more potential states of use for use on said computing system;
    making said one or more potential state of use accessible or more accessible for use on said computing system; and
    initiating said one or more potential state of use for use on said computing system.

8. The computing system of claim 7, wherein said predicting comprises:
    assigning probabilities of use to said one or more potential states of use; and
    identifying a potential state of use with the highest probability as a likely state of use.

9. The computing system of claim 8, wherein said method further comprises one or more of the following:
    recommending and/or offering said likely state of use for use on said computing system;
    making said likely state of use accessible or more accessible for use on said computing system; and
    initiating said likely state of use for use on said computing system.

10. The computing system of claim 1, wherein said state of use includes the states of one or more applications, tasks, and/or services on said computing system.

11. The computing system of claim 1, wherein said computing system is further adapted for and/or capable of one or more of the following:
    recommending and/or offering one or more applications, tasks and/or services for use on said computing system;

recommending and/or offering one or more applications tasks and/or services for use on said computing system in accordance with one or more respective manner of use of said one or more applications;

initiating one or more applications tasks and/or services for use on said computing system;

initiating one or more applications tasks and/or services for use on said computing system in accordance with one or more parameters;

making one or more applications tasks and/or services accessible or more accessible for use on said computing system; and making one or more applications tasks and/or services accessible or more accessible for use on said computing system in accordance with one or more parameters, configuration parameters and/or configuration settings.

12. The computing system of claim 1, wherein said obtaining of said one or more matching situations comprises:

determining whether at least one of said one or more matching situations is known; and obtaining, based on said first situation, a pattern of use of said computing system when said determining determines that said matching situation is not known.

13. The computing system of claim 1, wherein said obtaining of said one or more matching situations comprises:

extracting said pattern of use from integrated state and contextual usage data for said computing system, wherein said integrated state and contextual usage data includes at least: (a) a first state of use of said computing system, and (b) a first context for said computing system effectively represented as a first situation associated with said first state of use of said computing system, whereby effectively indicating that in said first situation said computing system has been used in accordance with said first state of use, and thereby allowing a pattern of use to be determined for said computing system at least based on the association of said first state of use with said first situation.

14. A method of identifying a potential use of a computing system, said method comprising:

(a) obtaining, at a processor, a first context for said computing system, wherein said first context can effectively represent a first situation for said computing system;

(b) obtaining, at the processor, one or more matching situations for said first situation, wherein said one or more matching situations are respectively associated with one or more corresponding states of use of said computing system; and identifying, at the processor, one or more of said corresponding states of use, as one or more potential states of use of said computing system predicting based on said one or more matching situations that said computing system is to be used in accordance with said one or more potential states of use;

recommending and/or offering said one or more potential states of use for use on said computing system;

assessing the accuracy of a recommendation made based on situational pattern of use data; and using said assessing of said accuracy of said recommendation to generate improved situational pattern of use data, thereby effectively providing feedback without requiring supervised training or direct feedback from a user of said computing system.

15. The method of claim 14, wherein said obtaining (a) of said first context for said computing system comprises receiving, reading, identifying, selecting, and/or determining said first context for said computing system, and wherein said obtaining (b) of said one or more matching situations as one or more matches for said first situation comprises: receiving, reading, identifying, selecting, and/or determining said one or more matching situations.

16. A computer readable medium including computer program code for identifying a potential use of a computing system, wherein said computer readable medium includes:

computer program code for obtaining a first context for said computing system, wherein said first context can effectively represent a first situation for said computing system;

computer program code for obtaining one or more matching situations for said first situation, wherein said one or more matching situations are respectively associated with one or more corresponding states of use of said computing system;

computer program code for identifying based on said one or more of said corresponding states of use, one or more potential states of use of said computing system;

computer program code for predicting based on said one or more matching situations that said computing system is to be used in accordance with said one or more potential states of use;

computer program code for recommending and/or offering said one or more potential states of use for use on said computing system;

computer program code for assessing the accuracy of a recommendation made based on situational pattern of use data; and computer program code for using said assessing of said accuracy of said recommendation to generate improved situational pattern of use data, thereby effectively providing feedback without requiring supervised training or direct feedback from a user of said computing system.

17. A method for recommending one or more usable components for use on a computing system, said method comprises:

obtaining, at a processor, a current context for said computing system as a current situation;

identifying, at the processor, one or more matching situations, from situational pattern of use data that effectively identifies a pattern of use of one or more usable components of said computing system, as one or more matches for said current situation, wherein each one of said one or more matching situations is associated with a corresponding state of use of said one or more usable components of said computing system, whereby effectively indicating that at least in a first matching situation, a first one or more usable components have been used in accordance with a first state of use; and recommending said first one or more usable components associated with said first matching situation, as one or more recommended usable components to be used in accordance with said first state of use;

determining whether said one or more recommended usable components are used in said first situation, thereby effectively assessing the accuracy of a recommendation made based on said situational pattern of use data; and using said assessing of said accuracy of said recommendation to generate improved situational pattern of use data, thereby effectively providing feedback without requiring supervised training or direct feedback from a user of said computing system.

18. The method as recited in claim 17, wherein said recommending of said one or more usable components comprises one or more of the following:
- initiating and/or offering to initiate said one or more usable components for use on said computing system; and
- making accessible or more accessible said one or more usable components for use on said computing system.

19. A method as recited in claim 17, wherein said identifying of said one or more matching situations comprises one or more of the following:
- searching for said one or more matching situations in said situational pattern of use data;
- generating said situational pattern of use data;
- generating said situational pattern of use data based on said first situation;
- generating said situational pattern of use data by extracting one or more patterns of use of said one or more components from obtaining integrated state and contextual usage data for said one or more usable components of said computing system, wherein said integrated state and contextual usage data includes at least: (a) a first state of use of said one or more usable components of said computing system and (b) a first context for said computing system effectively represented as a first situation associated with said first state of use of said one or more usable components of said computing system, whereby effectively indicating that in said first situation said one or more components of said computing system have been used in accordance with said first state of use, and thereby allowing a pattern of use to be determined for said one or more usable components of said computing system at least based on the association of said first state of use with said first situation; and
- transforming state of use and contextual usage information associated with use of said one or more usable components in a form that is ready for extraction of one or more patterns.

20. A method as recited in claim 17, wherein said method further comprises one or more of the following:
- obtaining a state of use for said one or more usable components of said computing system as state of use information when said one or more usable components are being used, wherein said state of use information effectively indicates a first state of use of said one or more usable components of said computing system;
- obtaining a context of use of said one or more usable components of said computing system as first contextual usage information when said one or more usable components are being used, wherein said first contextual usage information effectively defines and/or indicates a first situation in which said one or more usable components have been used;
- combining said first state of use information and first contextual usage information together to form integrated state and contextual usage data that effectively indicates that in said first situation said one or more useable components have been used in accordance with said first state of use, thereby allowing a pattern of use of said computing system to be determined at least based on the knowledge of the use of said one or more usable components in accordance with said first state in said first situation;
- transforming said integrated state and contextual usage information to a pattern extraction ready form which allows extraction of one or more patterns of use based on one or more pattern extraction techniques; and
- transforming said integrated state and contextual usage information, based on said first situation, to a pattern extraction ready form which allows extraction of one or more patterns of use that are more suited for said first situation, based on one or more pattern extraction techniques.

21. A method as recited in claim 17, wherein said method further comprises:
- determining whether said recommended one or more usable components are used in said first situation, thereby effectively assessing the accuracy of a recommendation which has been made based on said situational pattern of use data; and
- storing the use of said recommended one or more usable components in said first situation when said determining determines that said one or more usable components are used as recommend by said recommendation, thereby allowing better situational pattern of data to be determined for said computing system.

22. A method as recited in claim 17,
- wherein said one or more usable components include one or more applications, tasks and/or services effectively provided by said computing system for use by one or more persons; and
- wherein said recommending comprises: recommending one or more recommended applications for use by said one or more persons.

23. A method as recited in claim 17, wherein said recommending further comprises: recommending a plurality of recommended applications arranged in an order representing the likelihood of use by said one or more persons.

24. A method as recited in claim 17, wherein said method further comprises:
- generating said situational pattern of use for said situational pattern of use when said situation is obtained, thereby generating said situational pattern of use in a dynamic manner.

25. A method for recommending one or more usable components for use on a computing system, said method comprises:
- obtaining, at a processor, a current context for said computing system as a current situation;
- identifying, at the processor, one or more matching situations, from situational pattern of use data that effectively identifies a pattern of use of one or more usable components of said computing system, as one or more matches for said current situation, wherein each one of said one or more matching situations is associated with a corresponding state of use of said one or more usable components of said computing system, whereby effectively indicating that at least in a first matching situation, a first one or more usable components have been used in accordance with a first state of use;
- recommending said first one or more usable components associated with said first matching situation, as one or more recommended usable components to be used in accordance with said first state of use;
- determining that one or more other usable components are used in said first situation instead of said recommended one or more usable components when said determining determines that said one or more usable components are not used; and
- storing the use of said one or more other usable components in said first situation when said determining determines that said one or more other usable components are used contrary to said recommendation, thereby allowing better situational patterns of data to be determined for said computing system.

26. A computer readable medium including computer program code for recommending one or more usable components for use on a computing system, wherein said computer readable medium includes:
    computer program code for obtaining a current context for said computing system as a current situation;
    computer program code for identifying one or more matching situations, from situational pattern of use data that effectively identifies a pattern of use of one or more usable components of said computing system, as one or more matches for said current situation, wherein each one of said one or more matching situations is associated with a corresponding state of use of said one or more usable components of said computing system, whereby effectively indicating that at least in a first matching situation, a first one or more usable components have been used in accordance with a first state of use;
    computer program code for recommending said first one or more usable components associated with said first matching situation, as one or more recommended usable components to be used in accordance with said first state of use;
    computer program code for determining whether said one or more recommended usable components are used in said first situation, thereby effectively assessing the accuracy of a recommendation made based on said situational pattern of use data; and
    computer program code for using said assessing of said accuracy of said recommendation to generate improved situational pattern of use data, thereby effectively providing feedback without requiring supervised training or direct feedback from a user of said computing system.

27. A computing system, comprising: a processor, a memory, and a situation-aware prediction system adapted for and/or capable of:
    obtaining a current context for a computing system as a current situation;
    obtaining one or more matching situations for said current situation, wherein said one or more matching situations are associated with one or more states of use of one or more usable components of said computing system;
    identify, based on said one or more states of use of one or more usable components, one or more potential usable components for use on said computing system;
    determining that one or more other usable components are used in said first situation instead of said recommended one or more usable components when said determining determines that said one or more usable components are not used;
    recommending said first one or more usable components associated with said first matching situation, as one or more recommended usable components to be used in accordance with said first state of use; and
    storing the use of said one or more other usable components in said first situation when said determining determines that said one or more other usable components are used contrary to said recommendation, thereby allowing better situational patterns of data to be determined for said computing system.

28. The computing system of claim 27, wherein said one or more usable components include one or more applications, tasks and/or services that are effectively supported be said computing device and/or can be performed by said computing system.

29. The computing system of claim 28, wherein said situation-aware prediction system is further adapted for and/or capable of one or more of the following:
    recommending and/or suggesting said one or more applications, tasks, and/or services for use on said computing system;
    initiating and/or offering to initiate said one or more applications, tasks and/or services for use on said computing system; and
    making accessible or more accessible said applications, tasks and/or services for use on said computing system.

30. The computing system of claim 27, wherein said computing system includes a mobile, portable and/or wireless computing device.

31. The computing system of claim 27, wherein said computing device is a mobile phone.

32. A computing system, comprising:
    a processor and a memory; and
    a context sensing system that is operable to:
        obtain a first context for said computing system, wherein said first context can effectively represent a first situation for said computing system; and
    a situation-aware usage prediction system that is operable to:
    obtain one or more matching situations for said first situation, wherein said one or more matching situations are respectively associated with one or more corresponding states of use of said computing system;
    determine based on said one or more of said corresponding states of use, one or more potential states of use of said computing system;
    predicting based on said one or more matching situations that said computing system is to be used in accordance with said one or more potential states of use;
    recommending and/or offering said one or more potential states of use for use on said computing system;
    assessing the accuracy of a recommendation made based on situational pattern of use data; and
    using said assessing of said accuracy of said recommendation to generate improved situational pattern of use data, thereby effectively providing feedback without requiring supervised training or direct feedback from a user of said computing system.

* * * * *